United States Patent
Kuran

(10) Patent No.: US 8,466,581 B2
(45) Date of Patent: Jun. 18, 2013

(54) SYSTEM AND METHOD FOR UTILITY POLE DISTRIBUTED SOLAR POWER GENERATION

(75) Inventor: Shihab Kuran, Green Brook, NJ (US)

(73) Assignee: PetraSolar, Inc., South Plainfield, NJ (US)

( * ) Notice: Subject to any disclaimer, the term of this patent is extended or adjusted under 35 U.S.C. 154(b) by 396 days.

(21) Appl. No.: 12/733,513

(22) PCT Filed: Nov. 18, 2008

(86) PCT No.: PCT/US2008/012877
§ 371 (c)(1),
(2), (4) Date: Mar. 4, 2010

(87) PCT Pub. No.: WO2010/014073
PCT Pub. Date: Feb. 4, 2010

(65) Prior Publication Data
US 2010/0327657 A1    Dec. 30, 2010

Related U.S. Application Data

(60) Provisional application No. 61/137,679, filed on Aug. 1, 2008.

(51) Int. Cl.
*H02J 1/00* (2006.01)
(52) U.S. Cl.
USPC .......................................................... 307/69
(58) Field of Classification Search
USPC .......................................................... 307/69
See application file for complete search history.

(56) References Cited

U.S. PATENT DOCUMENTS

| | | | |
|---|---|---|---|
| 4,281,369 A | 7/1981 | Batte | |
| 5,225,712 A | 7/1993 | Erdman | |
| 6,750,391 B2 | 6/2004 | Bower et al. | |
| 7,687,937 B2 * | 3/2010 | Lasseter et al. | 307/69 |
| 7,772,716 B2 * | 8/2010 | Shaver et al. | 307/31 |
| 7,986,122 B2 * | 7/2011 | Fornage et al. | 320/101 |
| 8,017,895 B2 * | 9/2011 | Moser | 250/203.4 |
| 8,097,980 B2 * | 1/2012 | Cyrus et al. | 307/64 |
| 2007/0135970 A1 * | 6/2007 | Zhou et al. | 700/286 |
| 2008/0103630 A1 * | 5/2008 | Eckroad | 700/286 |

FOREIGN PATENT DOCUMENTS

FR    2894401    6/2007

OTHER PUBLICATIONS

Canadian Official Action mailed May 16, 2012 in Application No. 2,699,636, 5 pages.

* cited by examiner

*Primary Examiner* — Robert L. Deberadinis
(74) *Attorney, Agent, or Firm* — Merchant & Gould

(57) ABSTRACT

A system and method for providing grid connected utility pole distributed solar power generation is disclosed. The system includes a utility pole, an inverter and one or more solar panels. Each of the one or more solar panels is mounted on the utility pole. The method includes receiving solar energy at the one or more solar panels. The one or more solar panels convert the solar energy to direct current (DC) electrical energy. Further, the method includes transmitting the DC electrical energy to the inverter, which is mounted on the utility pole. The inverter can be integrated with one or more solar panels to form an alternating current photovoltaic (AC PV) module. Furthermore, the method includes converting the DC electrical energy to alternating current (AC) electrical energy by the inverter and transmitting the AC electrical energy to a grid for power distribution.

29 Claims, 22 Drawing Sheets

FIG. 1 – Prior Art

SYSTEM AND METHOD FOR UTILITY POLE DISTRIBUTED SOLAR POWER GENERATION

CROSS REFERENCE TO RELATED APPLICATION

This application is a National Stage Application of International Application No. PCT/US08/12877 entitled "SYSTEM AND METHOD FOR UTILITY POLE DISTRIBUTED SOLAR POWER GENERATION" filed Nov. 18, 2008, which claims the benefit under provisions of 35 U.S.C. §119(e) of U.S. Provisional Application No. 61/137,679, filed Aug. 1, 2008, both of which are incorporated herein by reference in their entirety.

BACKGROUND OF THE INVENTION

The invention relates generally to solar power generation, and more particularly, to a system and method for utility pole distributed solar power generation.

Power generation and distribution has been a backbone of rapid growth of modern times. Traditionally, large-scale power generation can be classified broadly as power generation from fossil fuel sources such as coal, oil, and natural gas, nuclear fuel sources, or renewable hydro/water sources. Utility power generation systems from these fuels have excellent economies of scale, and usually transmit electricity over long distances. Most of these power generation systems are built at a large distance from cities due to many factors including economical, health & safety, logistical, environmental, geographical, and geological factors. In addition, the generation sites are centralized, i.e. the power is generated at one site and then distributed to distant cities and locales.

The use of non-conventional sources of energy such as renewable sources (solar, wind, biomass, etc.) commonly provides another approach to power generation known as distributed power generation. The distributed power generation model entails generating power at various small-scale locations and distributing the generated power for local consumption. The most common distributed power generation system is the distributed solar power generation system. Typically, large distributed solar power generation systems are placed in large open areas to generate electricity from solar energy.

The above mentioned power generation and distribution systems suffer from one or more disadvantages. The distribution of power from centralized power generation systems results in loss of energy during transmission over large distances. Further, use of large distributed solar power generation systems in open areas does not minimize the power loss during transmission of electricity.

Another method of distributed solar power generation system electricity is generation by smaller distributed solar power generation systems. In these systems, solar panels 104 are placed on the roofs of buildings and connected to junction box 106, as depicted in FIG. 1. These small-scale power generation systems provide an alternative or an enhancement to traditional sources of centrally located power generation stations and distribution. One such method is illustrated in U.S. Pat. No. 4,281,369, titled "Method and apparatus for solar power lighting". The patent provides a lighting system having a remote solar panel array disposed about a light pole. The system stores the electrical energy in the form of direct current electrical energy in a plurality of batteries.

The use of small distributed solar power generation systems provides an electricity generation system which is pollution free with low transmission losses. However, the cost of installation of such systems is relatively high. This is due to the fact that a homeowner will be required to obtain insurance against roof leaks and damage. Furthermore, several service companies are involved in these installations, which contribute to increased cost.

In light of these limitations, there is a need for a pollution-free, low-cost power generation and distribution system with minimum electricity loss. A distributed solar power generation system with minimal installation costs, minimal distribution losses, and highly efficient generation capability is desired.

SUMMARY

A system for utility pole distributed solar power generation is provided. The system includes a utility pole, an inverter, and one or more solar panels. Each of the one or more solar panels is mounted on the utility pole. The one or more solar panels can be flexible panels. The one or more solar panels receive solar energy from the sun and convert the solar energy to direct current (DC) electrical energy. The inverter, which is mounted on the utility pole, converts the DC electrical energy converted by the one or more solar panels to alternating current (AC) electrical energy at the utility pole. The inverter is grid-tied and the generated AC electrical energy is transmitted to the utility grid via the utility pole. That is, the system is connected to the power lines of the utility pole. The AC electrical energy generated can be single phase or three phase.

A system for utility pole distributed solar power generation is provided. The system includes a utility pole and an alternating current photovoltaic (AC PV) module. The AC PV module converts the solar energy into alternating current (AC) electrical energy. The AC electrical energy generated can be of single phase or three phase. The AC PV module includes one or more solar panels and an integrated inverter. The AC PV module is mounted on the utility pole. The AC PV module is grid-tied and the generated AC electrical energy is transmitted to the utility grid via the utility pole.

A system for utility pole distributed solar power flow controller is provided. The system includes an alternating current photovoltaic (AC PV) module. The AC PV module converts the solar energy into alternating current (AC) electrical energy. The AC electrical energy generated can be of single phase or three phase. The AC PV module includes one or more solar panels and an integrated inverter. The AC PV module is mounted on the utility pole. The AC PV module produces active power (Watts) and/or non-linear reactive power (VARs). The AC PV module is grid-tied and the generated AC electrical energy is transmitted to the utility grid via the utility pole.

A method for distributed solar power generation is provided which includes receiving solar energy by one or more solar panels. The one or more solar panels are mounted on a utility pole. The one or more solar panels convert solar energy to direct current (DC) electrical energy. The converted DC electrical energy is transmitted to an inverter. The inverter is mounted on the utility pole. The inverter converts the DC electrical energy to alternating current (AC) electrical energy. The AC electrical energy converted by the inverter is fed to a grid for distribution. In one embodiment, the inverter is capable of generating active power (Watts), reactive power (VARs), or a combination of active and reactive power. The inverter is grid-tied and the generated AC electrical energy is transmitted to the utility grid via the utility pole.

A method for distributed solar power generation is provided which includes receiving solar energy by one or more solar panels of an alternating current photovoltaic (AC PV) module. The AC PV module mounted on a utility pole converts the solar energy into alternating current (AC) electrical energy. The AC PV module is capable of generating active power (Watts), reactive power (VARs), or a combination of active and reactive power. The AC PV module is grid-tied and the generated AC electrical energy is transmitted to the utility grid via the utility pole.

The utility pole can be a low voltage utility distribution pole or a high voltage transmission tower.

BRIEF DESCRIPTION OF THE DRAWINGS

The accompanying figures together with the detailed description below form a part of the specification, in accordance with the present invention. Like reference numerals shown in each figure refer to identical or functionally similar elements throughout the separate views. The figures further serve to illustrate various embodiments and explain various principles and advantages, all in accordance with the present invention.

Figure 1:
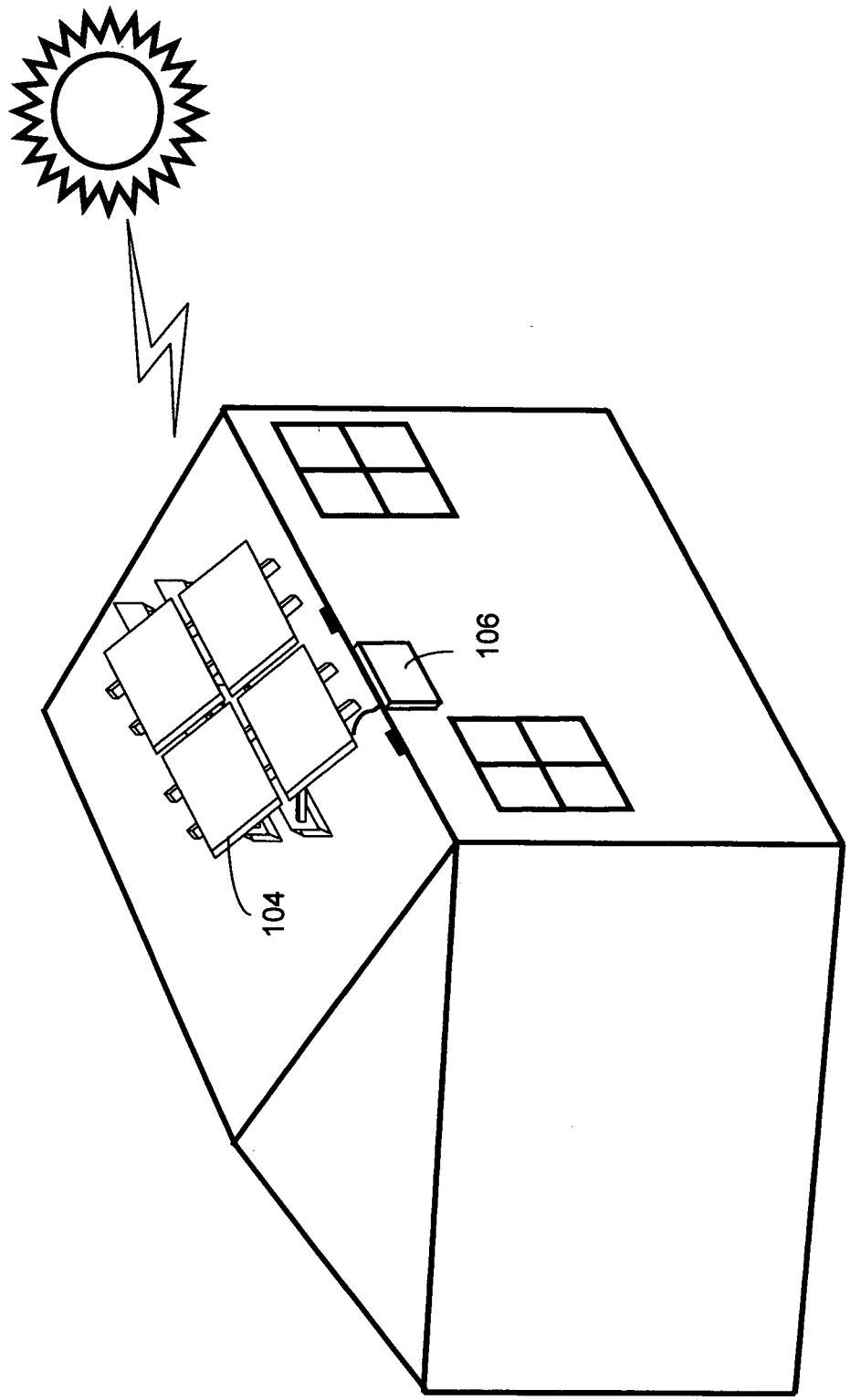
FIG. 1 illustrates a conventional distributed solar power generation system with solar panels mounted on a roof.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 2:
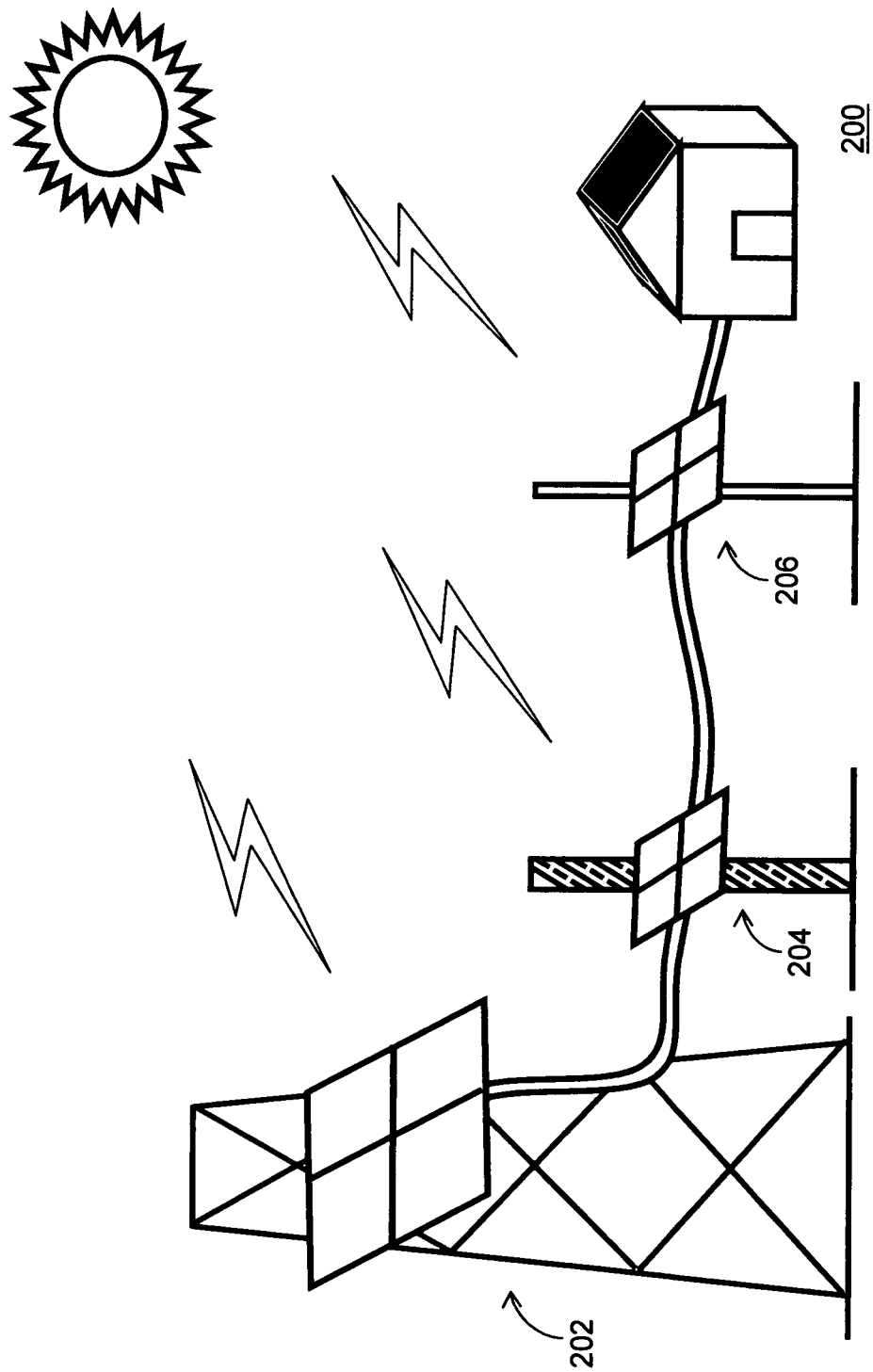
FIG. 2 illustrates an exemplary environment 200 for a distributed solar power generation system in which various configurations of the present invention can be deployed.

FIG. 2 illustrates an exemplary environment 200 for a decentralized distributed solar power generation system in which various embodiments of the present invention can be practiced. The decentralized distributed solar power generation system includes a distributed solar power generation system 202, a distributed solar power generation system 204 and a distributed solar power generation system 206. Each of the distributed solar power generation systems 202, 204, and 206, which are described in detail below, include one or more solar panels along with an inverter to convert solar energy to electrical energy. The one or more solar panels along with the inverter are mounted to a utility pole which can be a power pole, distribution pole, transmission pole, street light pole, traffic signal pole, a telephone pole, or any type of utility pole that is connected to the utility grid. Each of the distributed solar power generation systems 202, 204, 206 is a grid-tie system and can operate on grid voltages of its corresponding grid.

The decentralized distributed solar power generation systems 200 can be used for generation and distribution of electricity to sites that have an electricity requirement. Examples of such sites include, but are not limited to, cities, industries, agricultural equipments, households, street lights etc.

Although the decentralized distributed solar power generation system 200, as illustrated in FIG. 2, is shown with only three distributed solar power generation systems, it will be apparent to those skilled in the art that the present invention can include any number of distributed solar power generation systems. The number of distributed solar power generation systems required will depend on the power requirements at a site where a decentralized distributed solar power generation system is installed.

Figure 3:
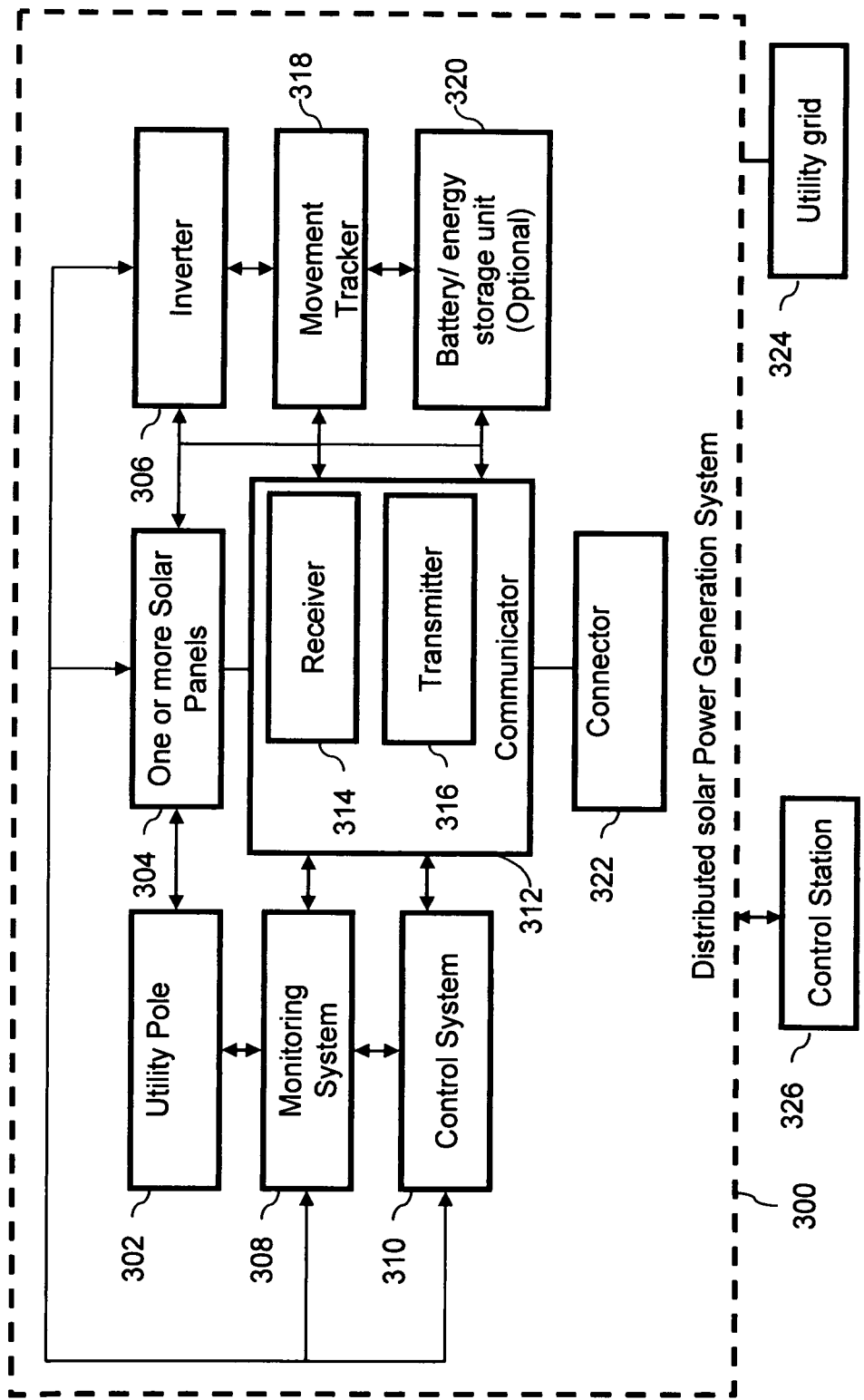
FIG. 3 illustrates a block diagram of a system for distributed solar power generation, in accordance with an embodiment of the present invention.

FIG. 3 illustrates a block diagram of a distributed solar power generation system 300 in accordance with an embodiment of the present invention. The distributed solar power generation system 300, as indicated in FIG. 3, has been shown with a dotted boundary to indicate that in some embodiments, various system elements of the distributed solar power generation system 300 can be present as separate entities. In another embodiment, the system elements of the distributed solar power generation system 300 can be part of a single system element. The distributed solar power generation system 300 includes a utility pole 302, one or more solar panels 304, and an inverter 306. The one or more solar panels 304 are mounted on the utility pole 302. Further, the inverter 306 is also mounted on the utility pole 302. The inverter can also be mounted on the solar panel mounting frame, or it can be integrated with at least one solar panel of the one or more solar panels 304. The one or more solar panels 304 can receive solar energy on exposure to the sun. Further, the one or more solar panels 304 are configured to convert the solar energy to Direct Current (DC) electrical energy. The DC electrical energy is transmitted to the inverter 306 where the DC electrical energy is converted to Alternating Current (AC) electrical energy. In one embodiment, the flow of DC electrical energy from the one or more solar panels 304 to the inverter 306 in the form of direct current is controlled by a controlling circuit present in the inverter 306. In another embodiment of the present invention, the inverter 306 complies with UL1741 and IEEE1547 standards for grid-tie or grid interactive inverters. In another embodiment, the inverter 306 can comply with any other equipment-grid interactive standard. These equipment-grid interactive standards can be different for different countries or regions. Thereafter, the AC electrical energy is transmitted to the utility grid 324 via the utility pole 302. That is, the system is connected to the power lines of the utility pole.

In one case, the distributed solar power generation system 300 can include a monitoring system 308. The monitoring system 308 can monitor the performance of at least one of the inverter 306 and the one or more solar panels 304. For example, the monitoring system 308 can monitor the inverter 306 to check if there are any significant losses in energy during conversion of DC electrical energy to AC electrical energy due to improper functioning of the inverter 306. In addition, in some cases, the monitoring system can include automatic metering functionality, which allows for tracking of the amount of energy being generated by the solar power generation system. Further, the distributed solar power generation system 300 can include a control system 310. The control system 310 can control the performance of at least one of the inverter 306 and the one or more panels 304. In an embodiment of the present invention, the control system 310 can control performance of at least one of the inverter 306 and the one or more solar panels 304 based on the monitoring system 308. The monitoring system 308 and the control system 310 communicate with a control station 326. The monitoring 308 and control system 310 present in the distributed solar power generation system 300 can communicate through a communicator 312. In one embodiment of the present invention the control station 326 can be a utility control unit from where we can control the various parameters of the distributed solar power generation system 300.

In some cases, the distributed solar power generation system 300 and the control system 310 are similar to Flexible AC Transmission System (FACTS) devices such as static volt-ampere reactive VAR compensators, static synchronous compensators, and thyristor controlled series compensators, etc. The FACTS is a power electronic-based system which enhances the security, capacity and flexibility of power transmission systems. FACTS solutions enable power grid owners to increase existing transmission network capacity while maintaining or improving the operating margins necessary for grid stability. As a result, more power at lower investment costs can reach consumers with a minimum impact on the environment after substantially shorter project implementation times, as compared to the alternative of building new transmission lines or power generation facilities. Therefore, when a system similar to FACTS is included, the distributed solar power generation system 300 can expand power transmission capacity of existing transmission lines and also enhance power system stability. However, the proposed solar units have a distinct advantage over FACTS in that the distributed solar power generation system 300 provides significant real power to the power system over time. FACTS devices are constrained by their energy storage elements and hence are primarily used for transient purposes. Hence the distributed solar power generation system 300 can better expand power transmission capacity and enhance power system stability over FACTS.

The inverters in the distributed solar power generation systems 300 enable various modes of controls of current, voltage, phase angle and impedance. Therefore, for the purpose of the overall power system analysis and control design, each of the distributed solar power generation systems 300 can be viewed as a Unified Power Flow Controller (UPFC) which provides simultaneous, real-time control of voltage, impedance and phase angle. The UPFC is further discussed in detail in conjunction with FIGS. 13 & 14.

In some embodiments of the present invention, the distributed solar power generation system 300 can include a communicator 312. The communicator 312 can be used for communication between the control system 310 and a remotely located control station 326. In one embodiment of the present invention the communicator 312 can be a part of the one or more solar panels. Further, the control station 326 can be used by a firm that provides the distributed solar power generation system 300 to control the functioning of the distributed solar power generation system 300. Further, the communicator 312 can include a receiver 314 and a transmitter 316. The receiver 314 can be configured to receive a control signal from the control station 326. Based on the control signal, the control system 310 can adjust the performance of the distributed solar power generation system 300. Further, the transmitter 316 can transmit a response signal to the control station 326 in response to the control signal. In one embodiment of the present invention, the response signal can indicate completion of adjustment of the distributed solar power generation system 300. In another embodiment of the present invention, the response signal can indicate the state of various parameters of the distributed solar power generation system 300. Further, in yet another embodiment of the present invention, the response signal can simply indicate successful receiving of the control signal. In yet another embodiment of the present invention, the communicator 312 follows the Supervisory Control and Data Acquisition (SCADA) system standard of data collection. Further, the communicator 312 can include one of Energy Management System (EMS) and Distribution Management Solution (DMS) standards. Further, the communicator 312 can follow any other standards based on requirements of the place of installation.

Further, in some other embodiments of the present invention, the distributed solar power generation system 300 can include a movement tracker 318. The movement tracker 318 can provide rotation to the one or more solar panels 304 up to 360 degrees about one or more axes of rotation. For example, the movement tracker 318 can rotate the one or more solar panels 304 to maximize the exposure of the one or more solar panels 304 to sunlight. Further, the movement tracker 318 can also be configured to provide lateral movement to the one or more solar panels 304 with respect to the utility pole 302. In one embodiment of the present invention, the movement tracker 318 can rotate the one or more solar panels 304 based on the monitoring system 308. In another embodiment of the present invention, the movement tracker 318 can rotate the one or more solar panels 304 based on the control signal as received by the communicator 312. Also, in some embodiments of the present invention, the control system 310 can control the movement tracker 318.

Further, in one embodiment of the present invention, the distributed solar power generation system 300 can include an energy storage unit 320. In one embodiment, the energy storage unit can be a battery. The energy storage unit 320 can receive the DC electrical energy from the one or more solar panels 304. The energy storage unit 320 can then transmit the DC electrical energy in the form of direct current to the inverter 306 for conversion of the DC electrical energy to AC electrical energy. In another embodiment of the present invention, the energy storage unit 320 can store at least a part of the DC electrical energy received from the one or more solar panels 304 before transmitting the DC electrical energy to the inverter 306. In the present invention, the energy storage unit 320 is strictly optional and is not needed for implementation of the present invention.

Further, in some embodiments of the present invention, the distributed solar power generation system 300 can include a connector 322. The connector 322 can facilitate connection between the inverter 306 and a utility grid 324 on which the distributed solar power generation system 300 is installed. Since the present invention is an on-grid application, the utility grid 324 provides a means to transmit AC electrical energy to various sites. Further, the present invention can be used for any on-grid voltage. For example, the utility grid 324 can be a high voltage electrical power distribution grid.

Figure 4:
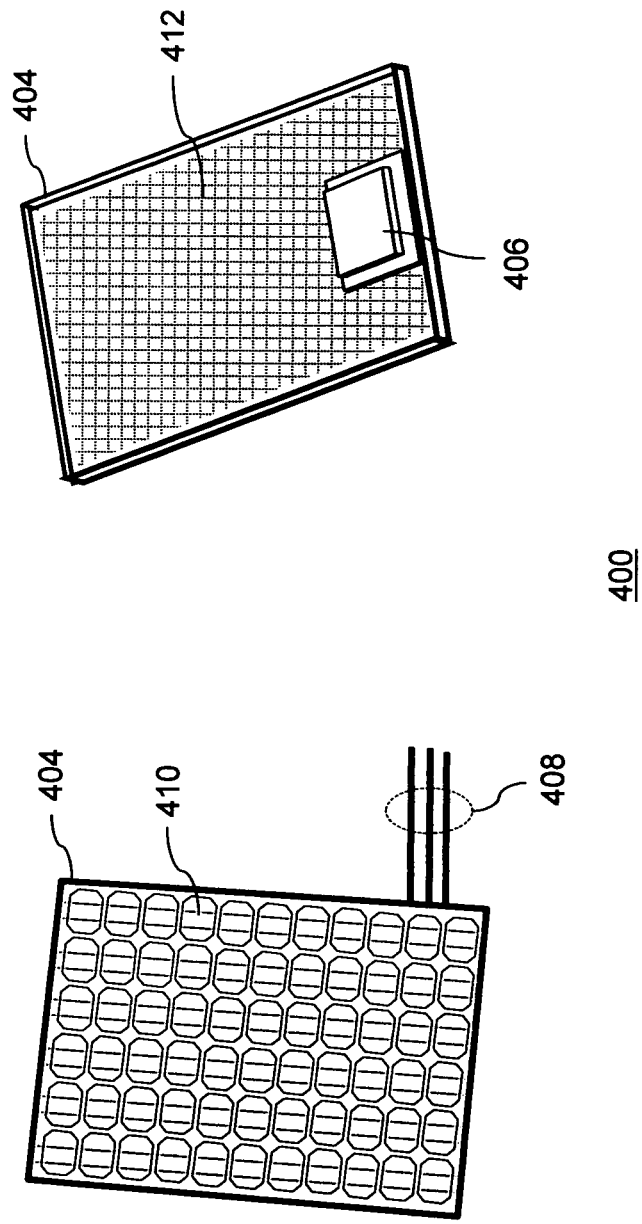
FIG. 4 illustrates an alternating current photovoltaic (AC PV) module with an integrated inverter.

FIG. 4 illustrates an alternating current photovoltaic (AC PV) module 400 in accordance with some embodiment of the present invention. To describe the system, references will be made to FIG. 3, although it will be apparent to those skilled in art that the present system can be used in any other embodiment of the present invention. The AC PV module 400 includes one or more solar panels 404 integrated with an inverter 406. The output of the AC PV module 408 is alternating current (AC). Front side 410 of the AC PV module 400 is exposed to the sunlight to receive the solar energy to be converted into DC electrical energy. The AC output wiring 408 connects the AC PV module 400 to the utility grid 324 which transfers the AC electrical energy generated by the AC PV module to the utility grid 324. The AC electrical energy generated can be single or three phase. The inverter 406 is attached to back side 412 of the AC. PV module 400. The inverter 406 converts the DC electrical energy to the AC electrical energy. The benefits of an AC PV module include simplified installation complexity, improved safety since no DC is readily accessible, optimal per panel performance since each inverter is matched to a single panel, and flexibility and expandability where a PV power generation system's capacity can be simply expanded by adding more AC PV modules The AC PV module 400 can receive solar energy from the sun and convert the solar energy to Alternating Current (AC) electrical energy. Thereafter, the AC electrical energy is transmitted from the distributed solar power generation system 300 for distribution and use.

Figure 5:
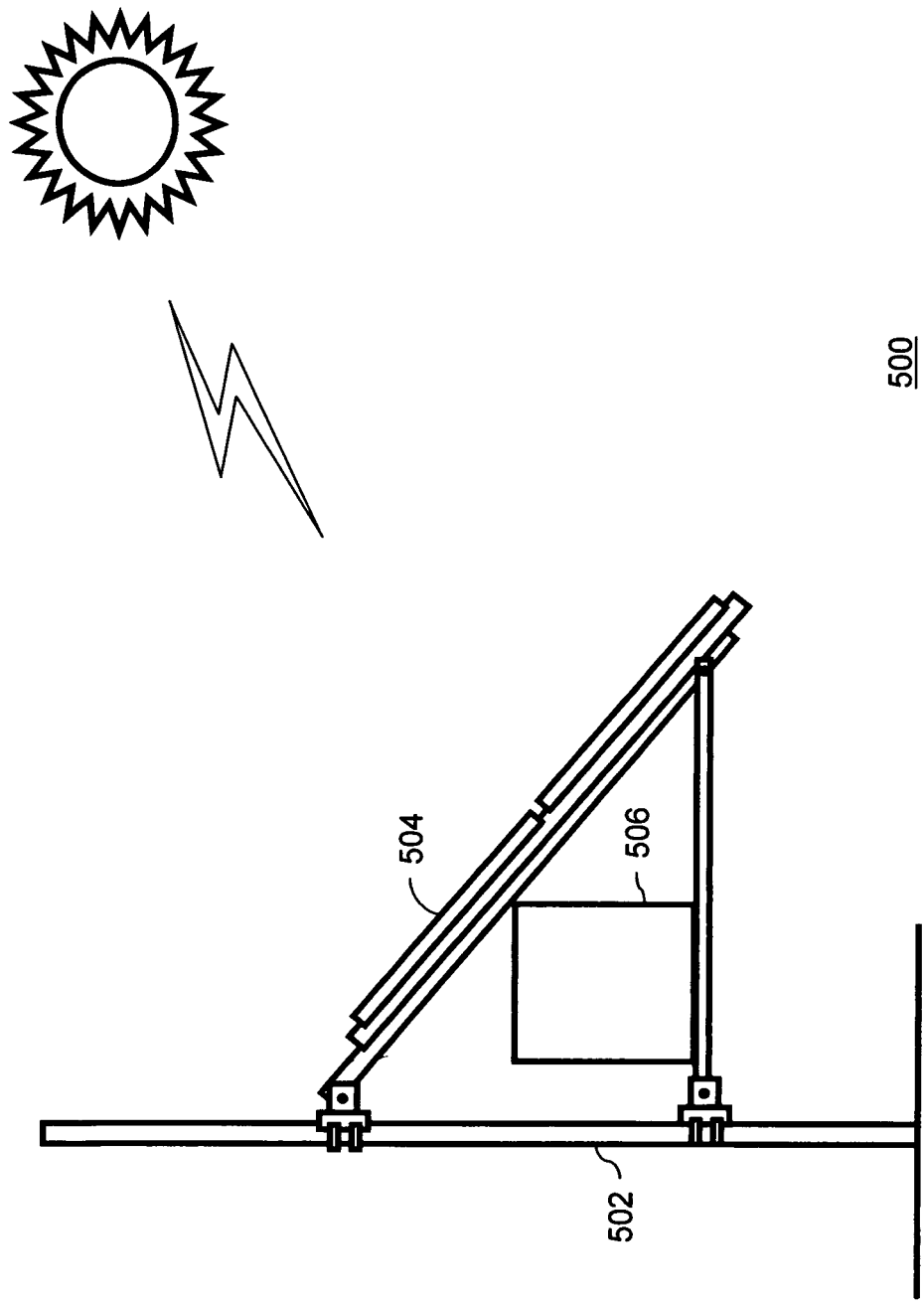
FIG. 5 illustrates a distributed solar power generation system, in accordance with an embodiment of the present invention.

FIG. 5 illustrates a distributed solar power generation system 500, in accordance with an embodiment of the present invention. To describe the system, references will be made to FIGS. 3 and 4, although it will be apparent to those skilled in the art that the present system can be used in any other embodiment of the present invention.

A distributed solar power generation system 500, as illustrated in FIG. 5, includes a utility pole 502, one or more solar panels 504 and an inverter 506. The one or more solar panels 504 are mounted on the utility pole 502. The inverter is electrically connected to the one or more solar panels 504. The inverter 506 can also be mounted on a mounting bracket of the one or more solar panels 504 or on a separate mounting frame.

Figure 6:
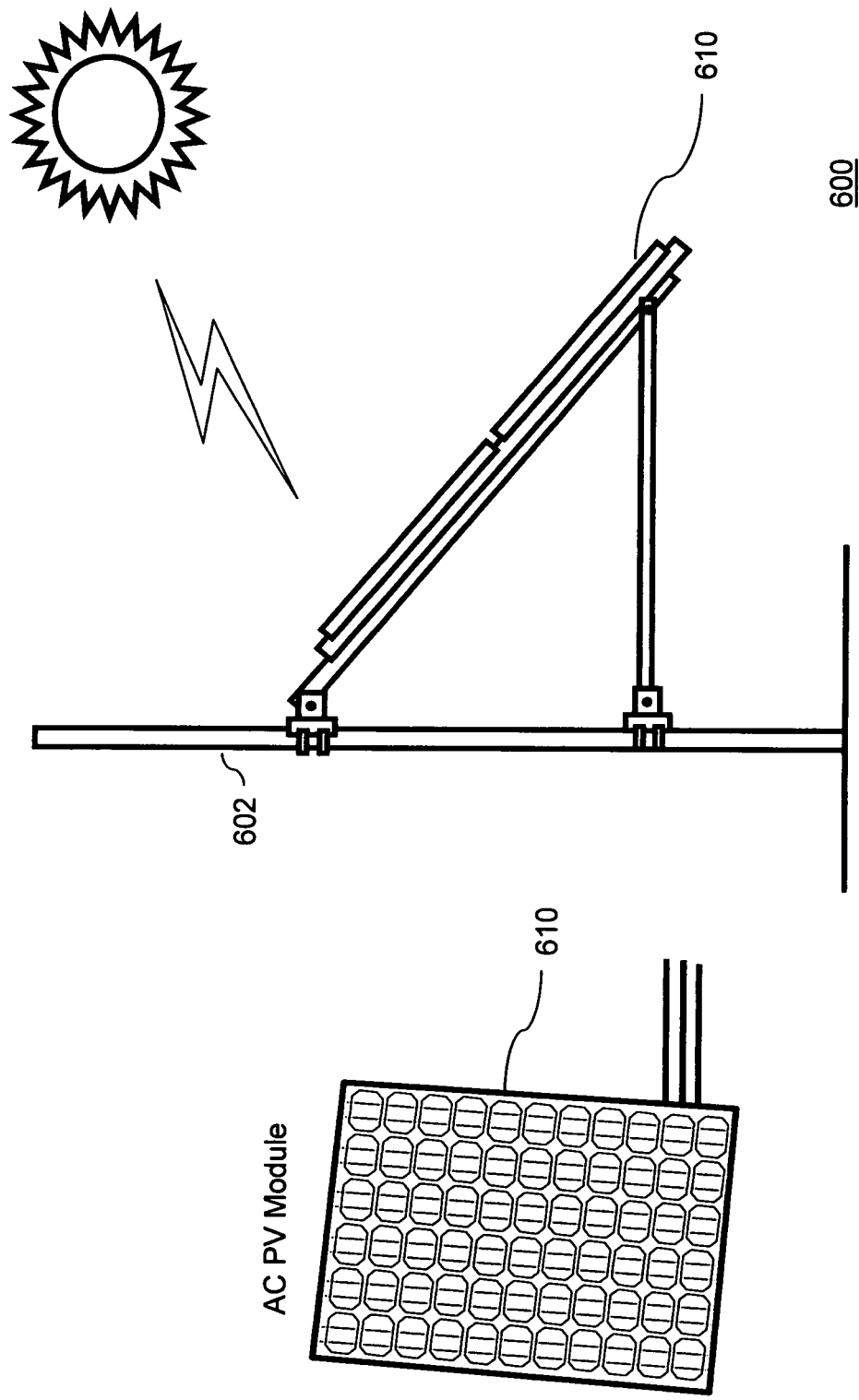
FIG. 6 illustrates a distributed solar power generation system in accordance with another embodiment of the present invention.

In one embodiment, the inverter 506 can directly be attached to the one or more solar panels 504. In this case, the one or more solar panels 504 together with the inverter 506 constitute an AC PV module 400 of FIG. 4. In one embodiment the inverter 506 can be fully integrated within the one or more solar panels 504. Therefore, the inverter 506 may not be visible as shown in FIG. 5. One can replace the one or more solar panels 504 and the inverter 506 by the AC PV module 400. The resultant distributed solar power generation system utilizing an AC PV module is illustrated in FIG. 6.

The distributed solar power generation system 500 is one of the various implementations of the distributed solar power generation system 300. The one or more solar panels 504 are functionally similar to the one or more solar panels 304 that are described in conjunction with FIG. 3. Similarly, the utility pole 502 and the inverter 506 are functionally similar to the utility pole 302 and the inverter 306 respectively.

The one or more solar panels 504 can receive solar energy from the sun. Further, the one or more solar panels 504 are configured to convert the solar energy to Direct Current (DC) electrical energy. The DC electrical energy is transmitted to the inverter 506. The inverter 506 converts the DC electrical energy to Alternating Current (AC) electrical energy. Thereafter, the AC electrical energy is transmitted from the distributed solar power generation system 500 for distribution and use. Further, as described in conjunction with FIG. 3, various other system elements can be mounted on the utility pole 502. For example, one or more of the monitoring system 308, the control system 310, the communicator 312, the movement tracker 318, the battery 320 and the connector 322 can be mounted on the utility pole 502.

It will be apparent to those skilled in the art that the distributed solar power generation system 500 as illustrated in FIG. 5 is for the sake of clarity, and the actual structure and configuration of the distributed solar power generation system 500 can be different from that illustrated in FIG. 5. In one embodiment of the present invention, the utility pole 502 can be any commonly available pole such as an electricity pole, telephone pole etc. Further, the utility pole 502, and therefore the distributed solar power generation system 500, can be located on a support structure for places such as parking lots and car ports etc.

It will be apparent to those skilled in the art that the distributed solar power generation system 500 can be used not only as an alternative to conventional power generation systems, but can also be used as an enhancement to the conventional power generation systems. In such cases, the distributed solar power generation system 500 can be implemented as a part of the distribution line of a conventional power generation system or as a part of the transmission line of a conventional power generation system. The distribution line operates at lower voltages as compared to the transmission line. The present invention can operate on both these voltage ranges. Therefore, in some cases, the utility pole 502 can be a distribution pole which is a part of the distribution line. Further, the utility pole 502 can be a transmission tower which is part of the transmission line. The utility pole 502 as a transmission tower is described in detail in conjunction with FIGS. 9 and 10. In general, the utility pole 502 can be a pole or support structure for any type of powered line. Examples of powered lines include, but are not limited to, transmission lines and distribution lines.

In an embodiment of the present invention, the material of the one or more solar panels 504 is a photovoltaic material. Examples of the photovoltaic material can include, but are not limited to, monocrystalline or polycrystalline thin film III-V materials. Further, examples of polycrystalline material can include, but are not limited to, cadmium telluride (CdTe) and copper indium (gallium) diselenide (CIS or CIGS). The photovoltaic material converts the solar energy obtained to direct current (DC) electrical energy.

In some cases, the one or more solar panels 504 can be flexible solar panels. The flexible solar panels result in various advantages for the one or more solar panels 504. The flexible solar panels can be foldable and hence, easy to transport and carry. The flexible solar panels, i.e. the one or more solar panels 504, can also be installed on the utility pole 502 in a manner similar to hoisting a flag. The flexible solar panels can therefore waive like a flag under the high pressure of wind and this increases the stability of the arrangement as compared to a system with rigid panels which can break under high pressure. Further, since the flexible solar panels are foldable, it increases the portability of the distributed solar power generation system 500. The flexible solar panels can allow designing solar panels to be used in extreme conditions.

Further, in some cases, the one or more solar panels 504 can be perforated. In such cases, the one or more solar panels 504 can be mounted on the utility pole 502 using the perforations such that the utility pole 502 passes through the perforations of the one or more solar panels. Further, the one or more solar panels 504 can be flexible solar panels with perforations.

The AC electrical energy from the distributed solar power generation system 500 can be transmitted to sites where AC electrical energy is required. Further, the inverter 506 mounted on the utility pole 502 can be configured to produce distributed reactive power and non-linear power to stabilize the utility grid 324 and thus improve the quality of the grid power. In some cases, the one or more solar panels 504 can be rotated and moved using the movement tracker 318.

FIG. 6 illustrates a distributed solar power generation system 600. To describe the system, references will be made to FIGS. 4 & 5. The distributed solar power system 600 is a variation of the distributed solar power generation system 500 and includes a utility pole 602 and an AC PV module 610. The AC PV module 610 consists of one or more solar panels 404 and an inverter 406 which can be attached to the one or more solar panels 404 or integrated within the one or more solar panels 404. The distributed solar power generation system 600 is similar to the distributed solar power generation system 500. In the distributed solar power generation system 600 the utility pole 602 is similar to the utility pole 502, the one or more solar panels 404 and the inverter 406 of the AC PV module 610 are similar to the one or more solar panels 504 and the inverter 506 respectively. In the distributed solar power generation system 600, the inverter 406 is integrated within the AC PV module 610, whereas, in the distributed solar power generation system 500 the inverter 506 is separate from the one or more solar panels 504.

Figure 7:
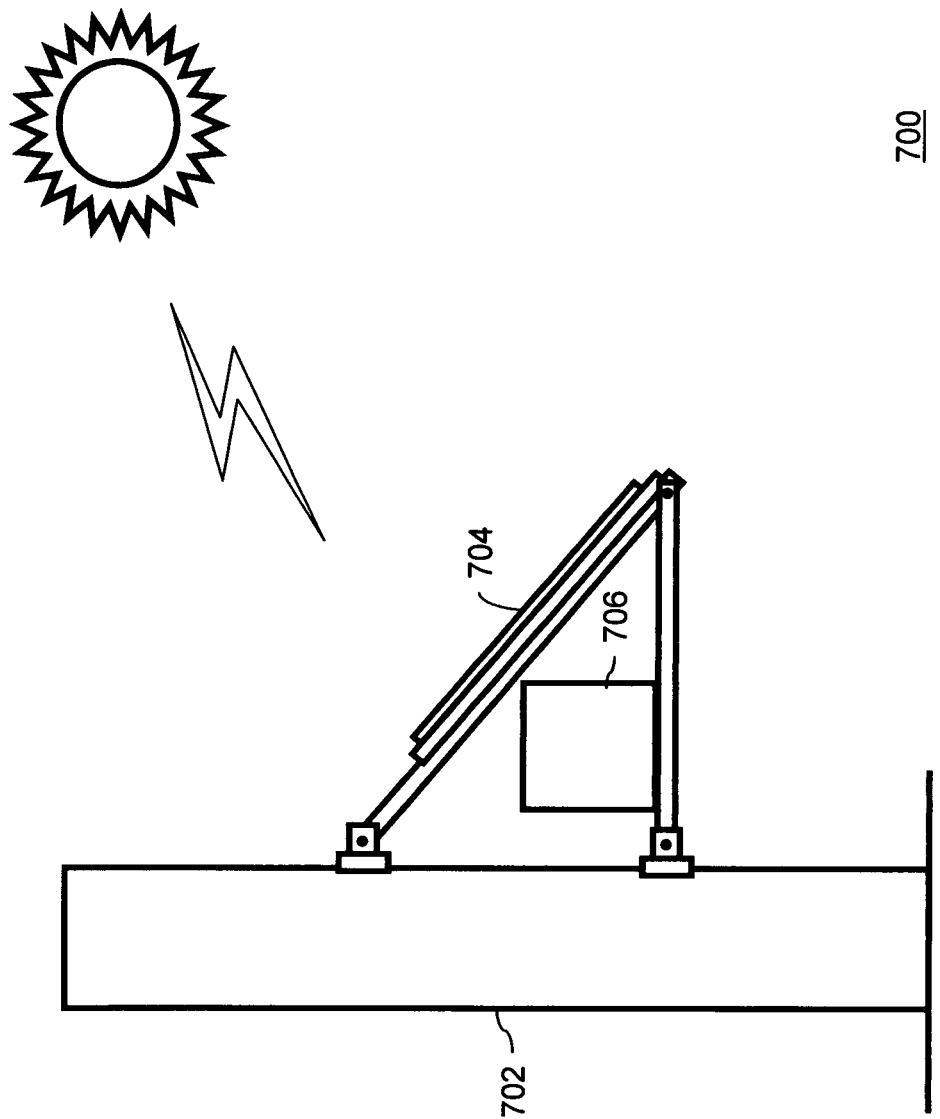
FIGS. 7-12 illustrate various distributed solar power generation systems, in accordance with some embodiments of the present invention.

FIG. 7 illustrates a distributed solar power generation system 700 which is a variation of the distributed solar power generation system 500. The distributed solar power system 700 includes a utility pole 702, one or more solar panels 704 and an inverter 706. The inverter 706 is electrically connected to the one or more solar panels 704. The one or more solar panels 704 are similar to the one or more solar panels 504 and the inverter 706 is similar to the inverter 506. In one embodiment, instead of the one or more solar panels 704 and the inverter 706 an AC PV module 400 of FIG. 4 can be deployed for generating AC electrical energy. The utility pole 702 as shown in FIG. 7 is similar to the utility pole 502. The utility pole 702 can be for example, a roadway sound barrier as depicted in FIG. 7.

It will be apparent to those skilled in the art that the distributed solar power generation system 700 as illustrated in FIG. 7 is for the sake of clarity, and the actual structure and configuration of the distributed solar power generation system 700 can be different from that illustrated in the FIG. 7.

The material of the one or more solar panels 704 can be the same as the material of the one or more solar panels 504, i.e. a photovoltaic material. As described in conjunction with FIG. 3, examples of the photovoltaic material can include, but are not limited to, monocrystalline or polycrystalline thin film III-V materials. The polycrystalline material can include cadmium telluride (CdTe) and copper indium (gallium) diselenide (CIS or CIGS). The photovoltaic material converts the solar energy obtained to direct current (DC) electrical energy. Further, the one or more solar panels 704 can be flexible solar panels as described in conjunction with FIG. 5.

Figure 8:
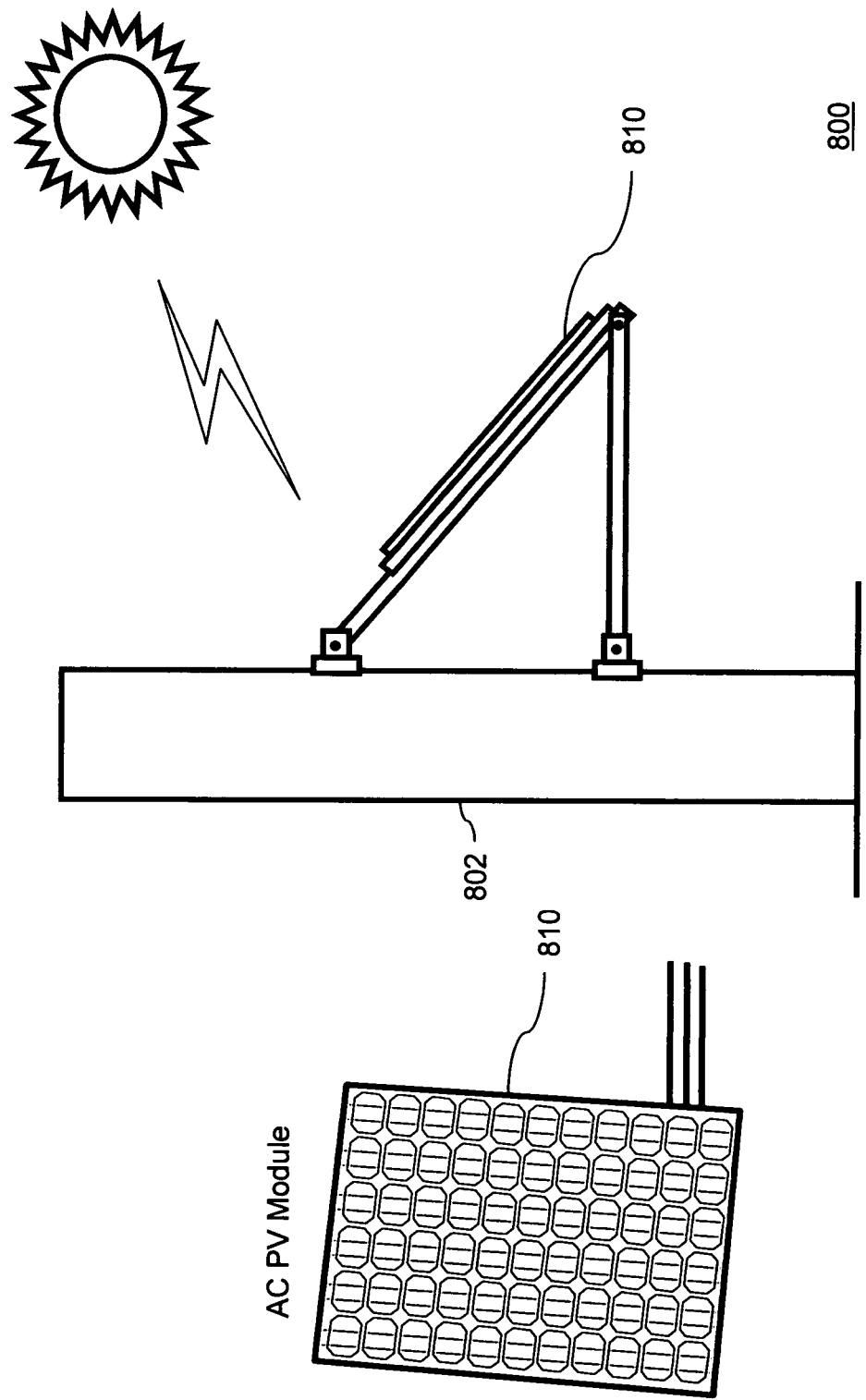

FIG. 8 illustrates a distributed solar power generation system 800. To describe the system, references will be made to FIGS. 3, 4, 5 & 7. The distributed solar power system 800 is a variation of the distributed solar power generation system 500 and includes a utility pole 802 and an AC PV module 810. The AC PV module 810 consists of one or more solar panels 404 and an inverter 406 which can be attached to the one or more solar panels 404 or integrated within the one or more solar panels 404. The distributed solar power generation system 800 is similar to the distributed solar power generation system 700. In the distributed solar power generation system 800 the utility pole 802 is similar to the utility pole 702, the one or more solar panels 404 and the inverter 406 of the AC PV module 810 are similar to the one or more solar panels 704 and the inverter 706 respectively. In one embodiment, instead of the one or more solar panels 704 and the inverter 706, an AC PV module 400 can be deployed for generating AC electrical energy as shown in FIG. 8. The AC electrical energy from the AC PV module 810 can be directly supplied to the utility grid 324.

Figure 9:
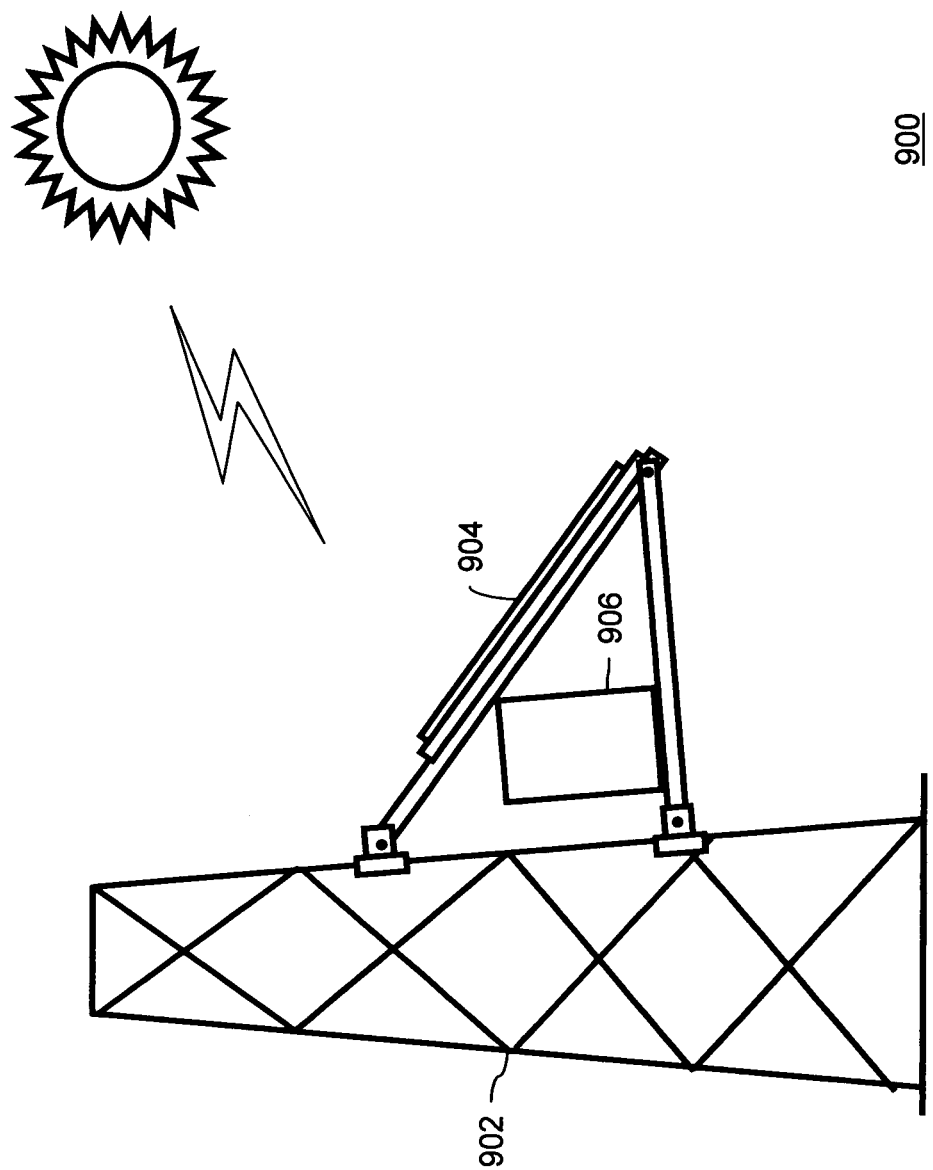

FIG. 9 illustrates a distributed solar power generation system 900 which is a variation of the distributed solar power generation system 500. The distributed solar power generation system 900 includes a utility pole 902, one or more solar panels 904 and an inverter 906. In one embodiment, the utility pole 902 can be a pole for any type of powered line. For example, in this embodiment, the utility pole 902 is depicted as a transmission tower.

In one embodiment of the present invention, the one or more solar panels 904 can be mounted on a mounting frame. In another embodiment of the present invention, the utility pole 902 can act as a mounting frame. The mounting frame provides support to the one or more solar panels 904. The inverter 906 can be placed on the mounting frame. As described in conjunction with FIG. 9, in some cases, the utility pole 902 can be a transmission tower. The transmission towers are used to transmit electricity generated by conventional power generation system to distant locations. The distributed solar power generation system 900 can therefore, act as an enhancement for conventional power generation systems. Further, in some other cases, the utility pole 902 can be a distribution line. The distribution lines are used to distribute power in a locality. The power transmitted to the distribution lines is transmitted using the transmission line. In general, the transmission lines carry higher voltages as compared to the distribution lines. Since the present invention works on the voltage of its grid line, the present invention can be used in transmission lines as well as distribution lines. In such a case, the inverter needs to be a high voltage three phase inverter suitable for connection with a transmission tower. As will be apparent to those skilled in the art, the utility pole 902 can be a pole used in any type of powered lines.

Figure 10:
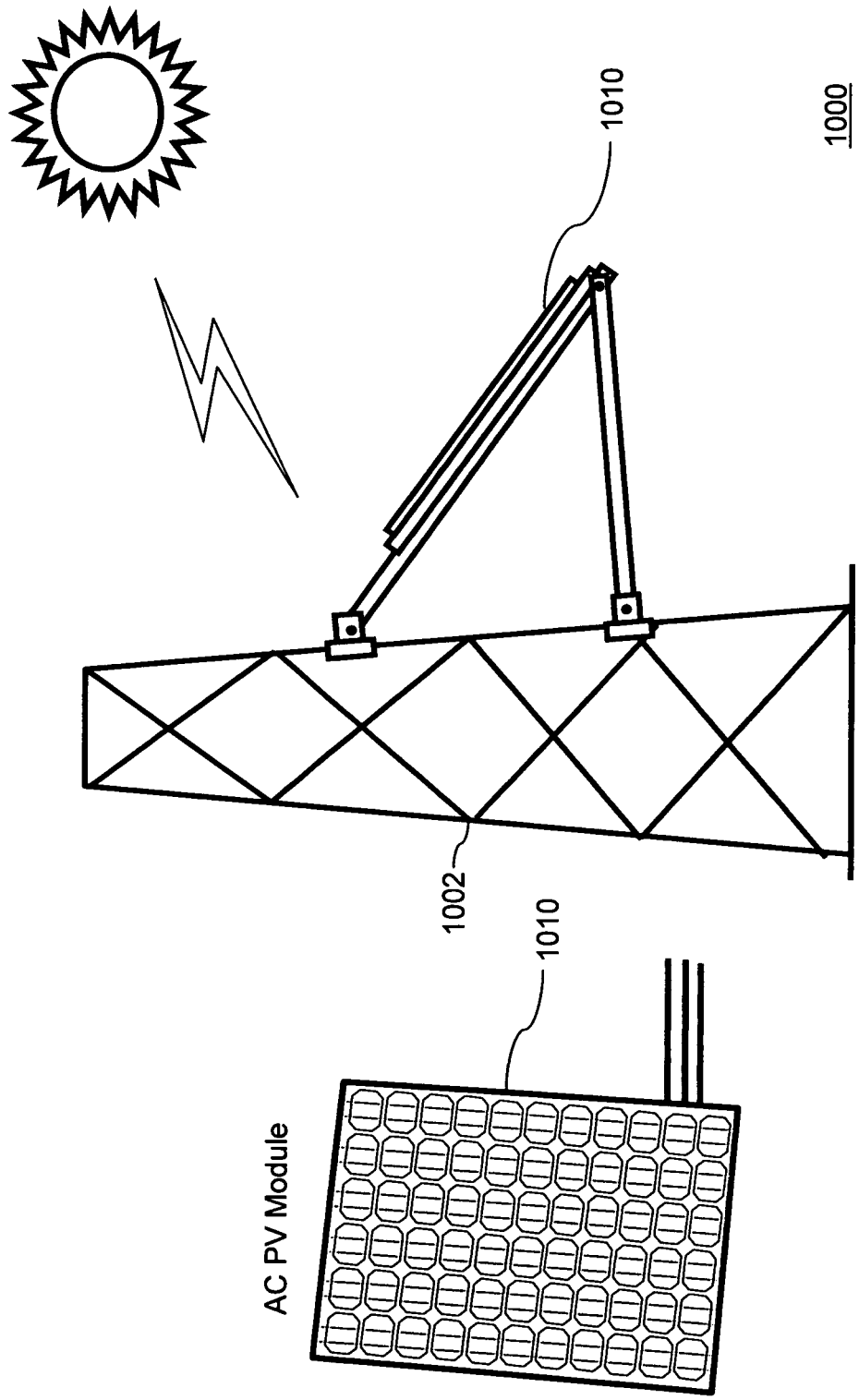

FIG. 10 illustrates a distributed solar power generation system 1000. To describe the system, references will be made to FIGS. 3, 4, 5 & 9. The distributed solar power system 1000 is a variation of the distributed solar power generation system 500 and includes a utility pole 1002 and an AC PV module 1010. The AC PV module 1010 consists of one or more solar panels 404 and an inverter 406 which can be attached to the one or more solar panels 404 or integrated within the one or more solar panels 404. The distributed solar power generation system 1000 is similar to the distributed solar power generation system 900. In the distributed solar power generation system 1000 the utility pole 1002 is similar to the utility pole 902, the one or more solar panels 404 and the inverter 406 of the AC PV module 1010 are similar to the one or more solar panels 904 and the inverter 906 respectively. In one embodiment, instead of the one or more solar panels 904 and the inverter 906, an AC PV module 400 can be deployed for generating AC electrical energy as shown in FIG. 10. The AC electrical energy from the AC PV module 1010 can be directly supplied to the utility grid 324.

Figure 11:
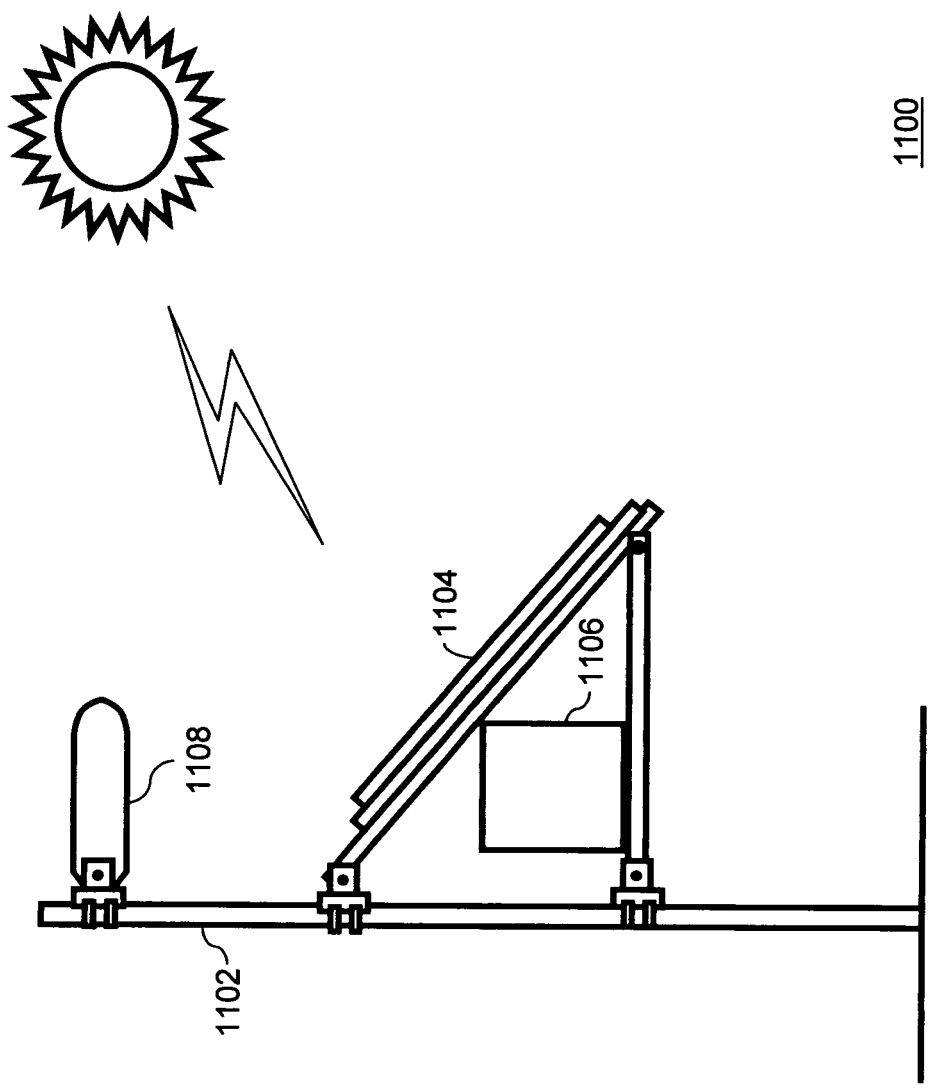

FIG. 11 illustrates a distributed solar power generation system 1100, in accordance with another embodiment of the present invention. The distributed solar power generation system 1100 is functionally similar to the distributed solar power system 500. The distributed solar power generation system 1100 includes a utility pole 1102, one or more solar panels 1104 and an inverter 1106 mounted on the utility pole 1102. The inverter 1106 supplies AC electrical energy to a utility grid 324 for distribution and use. In one embodiment, instead of the one or more solar panels 1104 and the inverter 1106, an AC PV module 400 can be deployed for generating AC electrical energy as shown in FIG. 12.

In one embodiment the utility pole 1102 can be a street light pole. In one embodiment the inverter 1106 at the utility pole 1102, i.e. the street light pole, can supply electricity directly to a light bulb 1108 via the utility grid 324. In another embodiment, the distributed solar power generation system can be installed on high poles similar to the street light pole to enhance on-grid power of the utility grid 324 supplying power to the lights on high poles. Further, these high poles can be used in stadiums and light houses etc. to provide floodlights. Further, the one or more solar panels 1104 can be flexible solar panels. The flexible solar panels are desirable on high poles to sustain high wind pressures.

Figure 12:
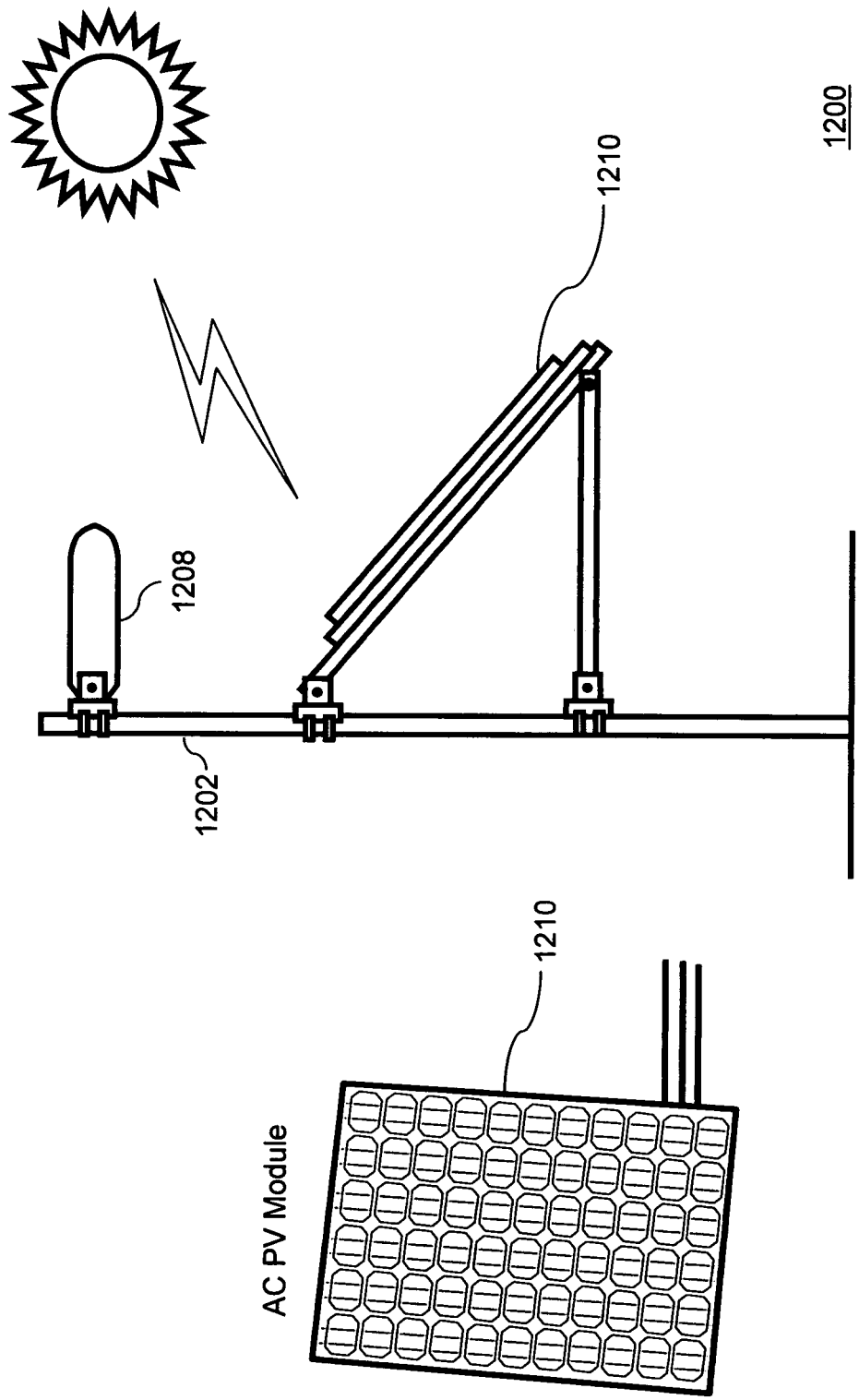

FIG. 12 illustrates a distributed solar power generation system 1200. To describe the system, references will be made to FIGS. 3, 4, 5 & 11. The distributed solar power system 1200 is a variation of the distributed solar power generation system 500 and includes a utility pole 1202 and an AC PV module 1210. The AC PV module 1210 consists of one or more solar panels 404 and an inverter 406 which can be attached to the one or more solar panels 404 or integrated within the one or more solar panels 404. The distributed solar power generation system 1200 is similar to the distributed solar power generation system 1100. In the distributed solar power generation system 1200 the utility pole 1202 is similar to the utility pole 1102, the one or more solar panels 404 and the inverter 406 of the AC PV module 1210 are similar to the one or more solar panels 1104 and the inverter 1106 respectively. In one embodiment, instead of the one or more solar panels 1104 and the inverter 1106, an AC PV module 400 can be deployed for generating AC electrical energy as shown in FIG. 12. The AC electrical energy from the AC PV module 1210 can be directly supplied to the utility grid 324.

Figure 13:
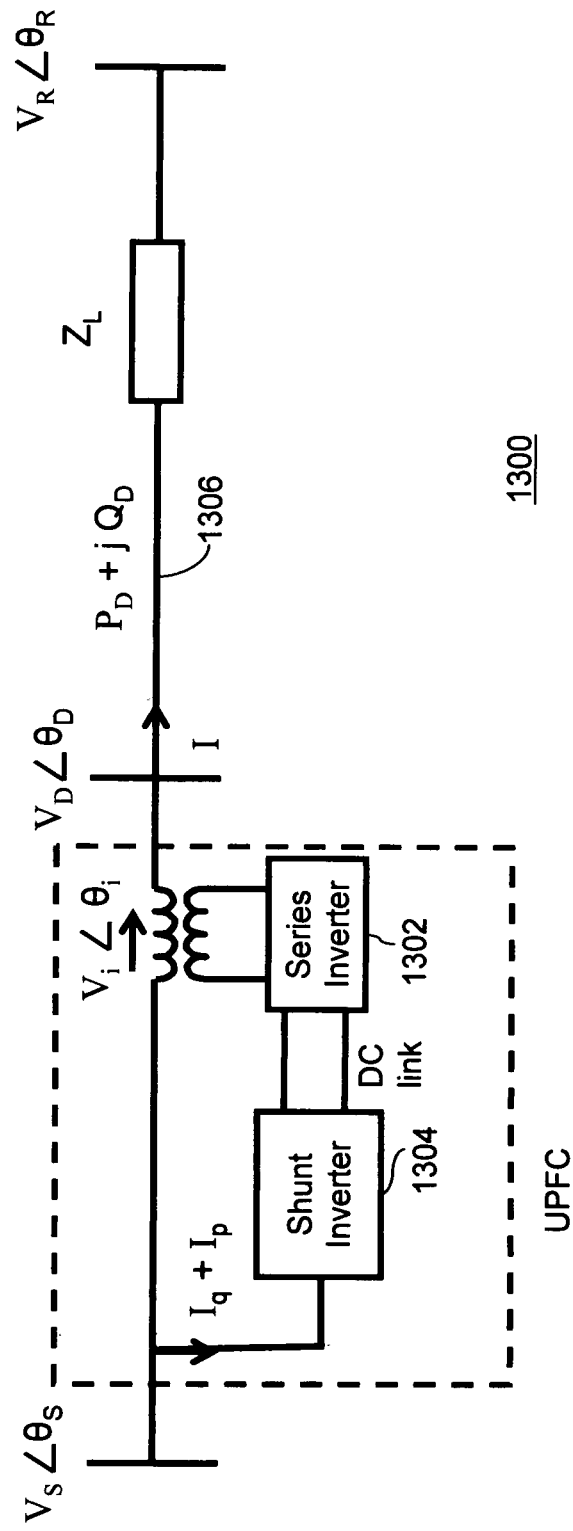
FIG. 13 illustrates a schematic diagram of a typical power flow controller.

FIG. 13 illustrates a schematic circuit diagram of a Unified Power Flow Controller (UPFC) 1300. Typically, the UPFC 1300 consists of two voltage-sourced switching inverters, i.e., a series inverter 1302 and a shunt inverter 1304.

The series inverter 1302 is connected in series with a grid line 1306, while the shunt inverter 1304 is linked to a terminal bus 1308. The two inverters, i.e. the series inverter 1302 and the shunt inverter 1304, are interconnected via a DC link. The AC electrical energy can flow in either direction between the two inverters, and each inverter can independently generate or absorb reactive power at its own AC terminals. The series inverter 1302 injects an AC voltage $V_i \angle \theta_i$ into the grid, where $V_i$ is the injected voltage and $\theta_i$ is phase angle of the injected voltage $V_i$. The magnitude and phase angle of AC voltages are controllable. Further, any real power exchange between the grid line 1306 and the series inverter 1302 is converted into DC power, and is supplied or absorbed by the shunt inverter 1304 via the DC link. Further, the shunt inverter 1304 can also be considered as a current source that provides independent reactive compensation for the transmission system. Thus the shunt inverter 1304 can control the terminal voltage. The current from the shunt inverter 1304 consists of two orthogonal elements: reactive current $I_q$ and active current $I_p$. The active current $I_p$ balances the real power injected into the grid line 1306 by the series inverter 1302. Quantities $V_S \angle \theta_S$ and $V_R \angle \theta_R$ are terminal voltages at the sending and receiving sides of the UPFC 1300, respectively. Further, $V_D \angle \theta_D$ is line-side voltage, $Z_L$ denotes line impedance, I represents line current, and $P_D + j Q_D$ is the power flow in the grid line 1306. The real and reactive power transfers in the grid line 1306 are given by the following expressions:

$$P_D = \frac{1}{R^2 + X^2} \{(V_i \cos\theta_i + V_s \cos\theta_s) \times [(V_i \cos\theta_i + V_s \cos\theta_s - V_R \cos\theta_R)R + (V_i \sin\theta_i + V_s \sin\theta_s - V_R \sin\theta_R)X] + (V_i \sin\theta_i + V_s \sin\theta_s) \times [(V_i \sin\theta_i + V_s \sin\theta_s - V_R \sin\theta_R)R - (V_i \cos\theta_i + V_s \cos\theta_s - V_R \cos\theta_R)X]\}, \quad (1)$$

$$Q_D = \frac{1}{R^2 + X^2} \{-(V_i \cos\theta_i + V_s \cos\theta_s) \times [(V_i \sin\theta_i + V_s \sin\theta_s - V_R \sin\theta_R)R - (V_i \cos\theta_i + V_s \cos\theta_s - V_R \cos\theta_R)X] + (V_i \sin\theta_i + V_s \sin\theta_s) \times [(V_i \cos\theta_i + V_s \cos\theta_s - V_R \cos\theta_R)R + (V_i \sin\theta_i + V_s \sin\theta_s - V_R \sin\theta_R)X]\}. \quad (2)$$

In equations (1) and (2), real power $P_D$ and reactive power $Q_D$ are expressed as functions of magnitude $V_i$ and phase angle $\theta_i$ of an injected voltage $V_i$.

Figure 14:
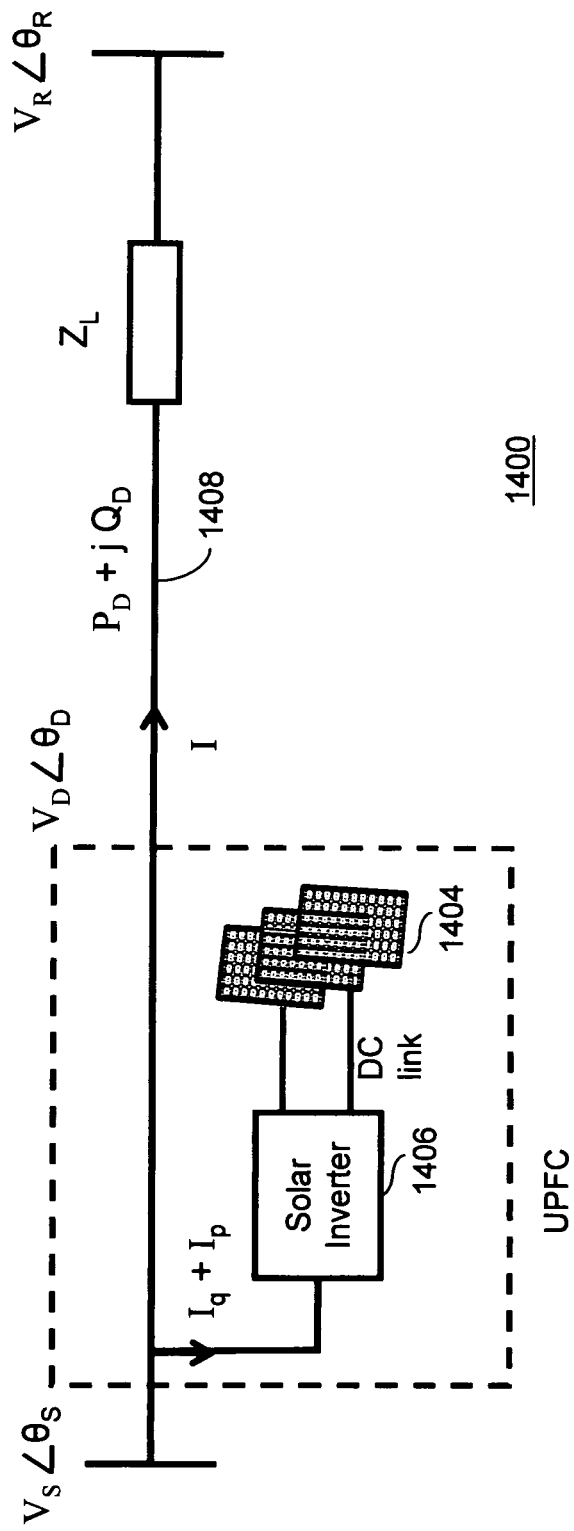
FIG. 14 illustrates a schematic distributed solar generation system in accordance with yet another embodiment of the present invention.

FIG. 14 illustrates a schematic circuit diagram of a distributed solar power generation system as a distributed Unified Power Flow Controller (UPFC) 1400 in conjunction with the present invention.

In contrast to the UPFC 1300 shown in FIG. 13, the injected voltage $V_i$ is zero while the solar inverter 1406 is configured as a shunt inverter. In addition, the DC power required to operate the inverter is supplied by the one or more solar panels 1404. The solar inverter 1406 can control the terminal voltage by controlling the amount of reactive current $I_q$ and the real power injected into the grid line 1408 can be balanced by the active current $I_p$.

When there is no injected voltage, magnitude $V_i$ is 0 and the power flow is determined by the distributed solar power generation system's parameters and operating condition. $P_D + j Q_D$ is the power flow in the grid line 1408. The real and reactive power transfers in the grid line 1408 are given by the following expressions:

$$P_D = \frac{1}{R^2 + X^2} \{V_s \cos\theta_s \times [(V_s \cos\theta_s - V_R \cos\theta_R)R + (V_s \sin\theta_s - V_R \sin\theta_R)X] + (V_s \sin\theta_s) \times [(V_s \sin\theta_s - V_R \sin\theta_R)R - (V_s \cos\theta_s - V_R \cos\theta_R)X]\}, \quad (3)$$

$$Q_D = \frac{1}{R^2 + X^2} \{-(V_s \cos\theta_s) \times [(V_s \sin\theta_s - V_R \cos\theta_R)R - (V_s \cos\theta_s - V_R \cos\theta_R)X] + (V_s \sin\theta_s) \times [(V_s \cos\theta_s - V_R \sin\theta_R)R + (V_s \sin\theta_s - V_R \sin\theta_R)X]\}. \quad (4)$$

In equation 3, $P_D$ denotes the real power and in equation 4 $Q_D$ denotes reactive power. Further, $V_D \angle \theta_D$ is line-side voltage, $Z_L$ denotes line impedance, I represents line current, and $P_D + j Q_D$ is the power flow in the grid line 1408.

Figure 15:
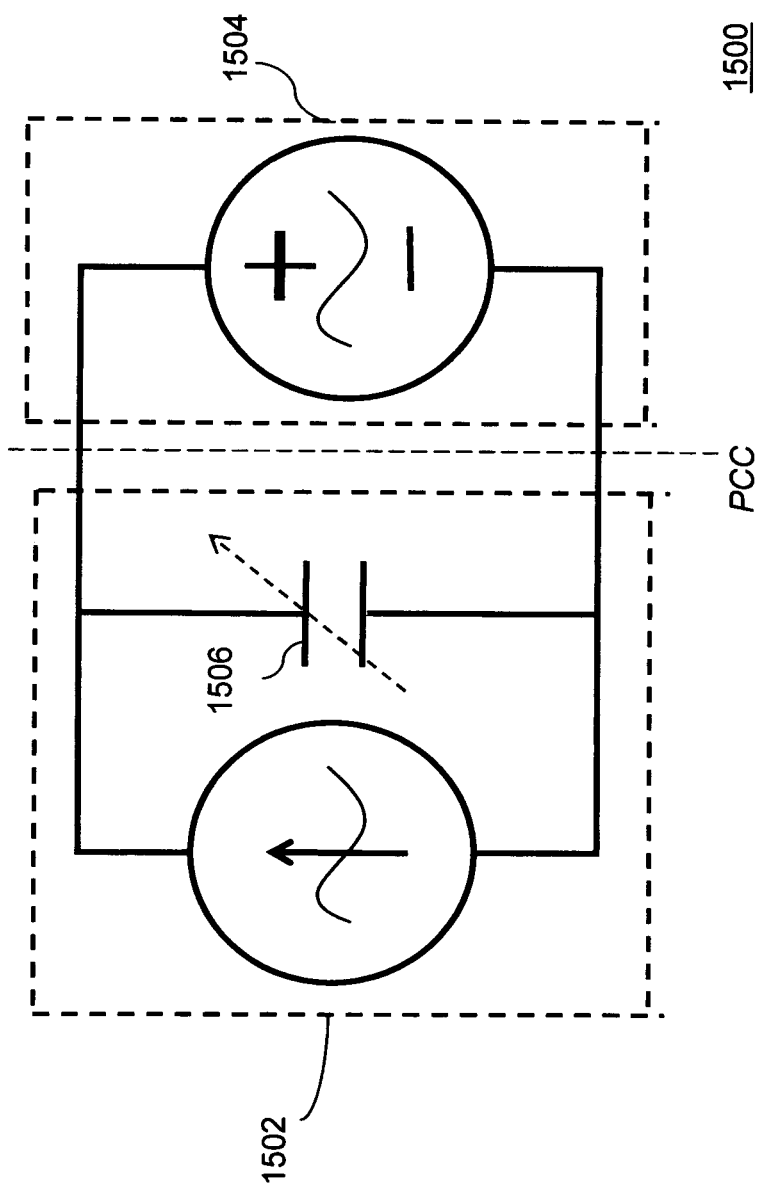
FIG. 15 illustrates a circuit diagram for reactive power compensation by a controlling circuit, in accordance with an embodiment of the present invention.
Figure 16:
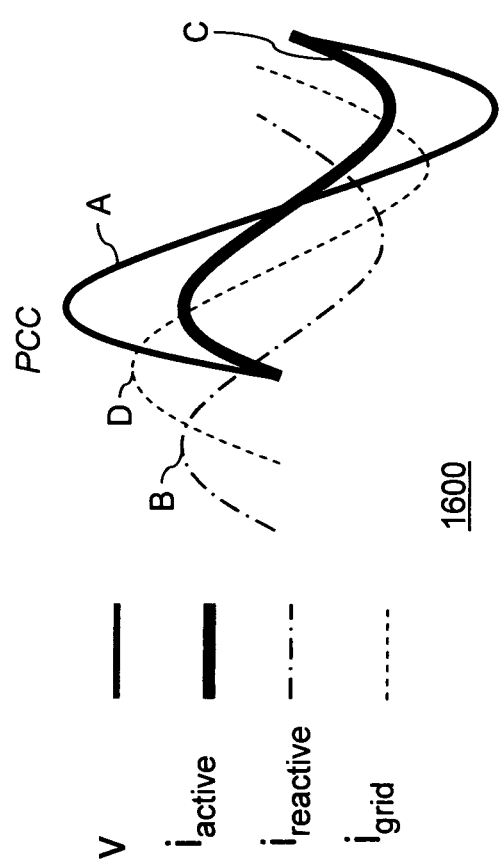
FIG. 16 illustrates a set of waveforms showing reactive power compensation by a controlling circuit, in accordance with an embodiment of the present invention.

FIGS. 15 and 16 illustrate, respectively, a circuit diagram for the reactive power compensation by a controlling circuit 1502 present in the inverter 306 and a set of waveforms 1600 corresponding to the controlling circuit 1502. To describe the circuit, references will be made to FIGS. 3, 4, and 5, although it will be apparent to those skilled in the art that the present invention can be applicable to any other embodiments. The controlling circuit 1502 is a grid-tie inverter having simple volt-ampere reactive (VAR) compensation capability. The controlling circuit is coupled with a utility grid 1504. The utility grid 1504 can be used for transmission of power from the distributed solar power generation system 300. The point of common coupling (PCC) between the controlling circuit 1502 and the utility grid 1504 has been illustrated in FIG. 16 using a dashed line PCC.

The controlling circuit 1502 can be programmed to add a specified amount of reactive current to the utility grid 1504, independent of active power injected. The amount of this reactive current is limited by the current carrying capability of the inverter output stage and the size of a bus capacitor 1506. In other words, the inverter stage can be programmed to emulate a controlled amount of apparent capacitance hanging off the line. Thus, reactive power compensation is achieved.

The effect of using the controlling circuit 1502 can be illustrated using the set of waveforms 1600. The set of waveforms 1600 includes a voltage waveform A, a reactive current waveform B, an active current waveform C and a grid current waveform D. The active current is the AC electrical energy received by the inverter 306 from the one or more solar panels 304. The controlling circuit 1502 can inject the reactive current in any amount irrespective of the active current. This means that the reactive current waveform B is independent of the active current waveform C. The grid current is the AC electrical energy that the inverter 306 supplies to the utility grid 1504. This grid current is transmitted by the utility grid 1504 for consumption. The grid current waveform D is the combination of the active current waveform C and the reactive current waveform B. Since the reactive current is independent of the active current, the reactive current can be used by the controlling circuit to control and stabilize the active current, and hence the grid current. This means that the grid current waveform D can be adjusted by the controlling circuit 1502 according to the need.

Figure 17:
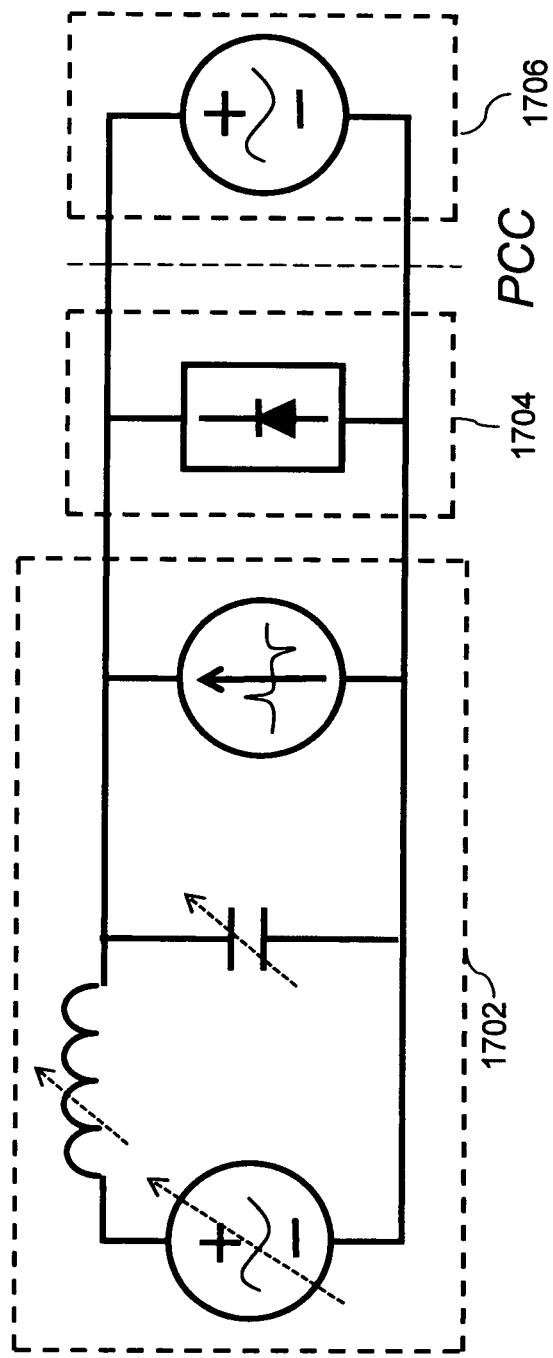
FIG. 17 illustrates another circuit diagram for reactive power compensation control, in accordance with another embodiment of the present invention.
Figure 18:
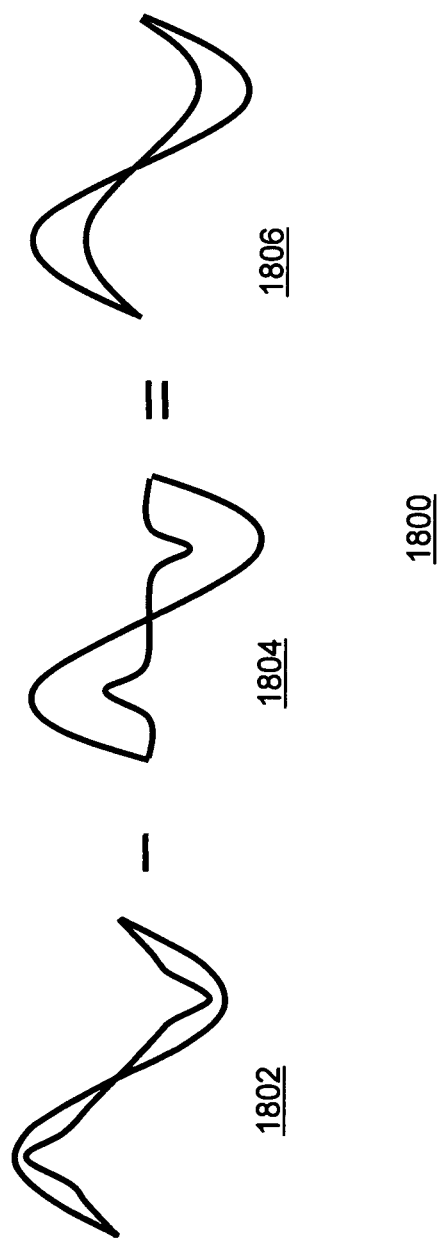
FIG. 18 illustrates sets of waveforms showing controlling of reactive power compensation, in accordance with another embodiment of the present invention.

FIGS. 17 and 18 illustrate, respectively, a circuit diagram for reactive power compensation by a controlling circuit 1702 present in the inverter 306 and a set of waveforms 1800 corresponding to the use of the controlling circuit 1702 in the present invention. To describe the circuit, references will be made to FIGS. 3, 4, and 5, although it will be apparent to those skilled in the art that the present invention can be applicable to any other embodiments. The controlling circuit 1702 can be used for controlling the quality of AC electrical energy transmitted from the distributed solar power generation system 300 to a utility grid 1706. In some cases, the controlling circuit 1702 can be remote controlled. Further, the controlling circuit 1702 can be capable of remote controlled volt-ampere reactive (VAR) injection. Further, the controlling circuit 1702 is capable of harmonic current injection. The harmonic current injected current can be represented as waveform 1802. The voltage stabilization of the AC electrical energy by the controlling circuit 1702 is carried out by controlling the amplitude droop in current. This amplitude droop can be because of local non-linear loads 1704 as illustrated in FIG. 18. The current loss due to this non-linear load can be represented as waveform 1804. The presence of harmonic current from the controlling circuit 1702 in the AC electrical energy can compensate for the amplitude droop due to non-linear loads. Therefore, the harmonic currents in the waveform 1802 can compensate for the current losses in the waveform 1804 to result in a stabilized output of AC electrical energy to the utility grid 1706. The stabilized output of AC electrical energy can be represented by a waveform 1806. In some cases, the controlling circuit 1702 can have smart power factor compensation. In one embodiment of the present invention, controlling circuit 1702 can be programmed to perform similar, more elaborate power factor compensation functions. Therefore, the controlling circuit 1702 provides a remote-controlled mechanism to control the quality of AC electrical energy.

Figure 19:
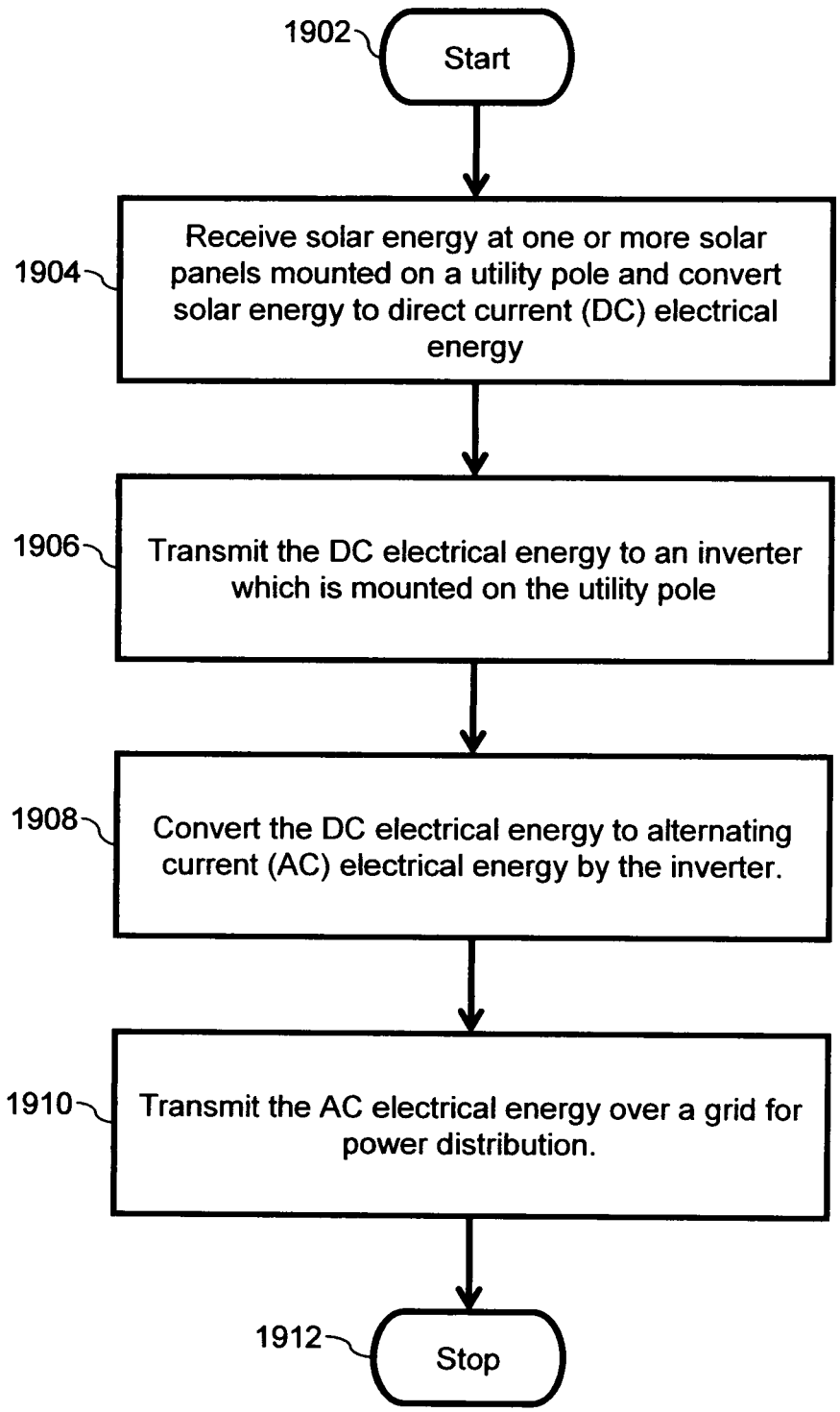
FIG. 19 illustrates a flowchart of a method for distributed solar power generation, in accordance with an embodiment of the present invention.

FIG. 19 is a flowchart illustrating a method for distributed solar power generation, in accordance with various embodiments of the present invention. To describe the method, references will be made to FIGS. 3, 4, and 5 although it will be apparent to those skilled in the art that the method can be applicable in various other embodiments of the present invention. Such embodiments are contemplated to be within the scope of the present invention. The method initiates at step 1902. At step 1904, the one or more solar panels 304, mounted on the utility pole 302, receive solar energy.

At step 1906, the DC electrical energy is transmitted to the inverter 306. The inverter 306 is mounted on the utility pole 302, the solar panel mounting frame, or attached to at least one of the one or more solar panels. At step 1908, the DC electrical energy received by the inverter 306 is converted to alternating current (AC) electrical energy. As described in conjunction with FIG. 3, in one embodiment of the present invention, flow of the DC electrical energy from the one or more solar panels 302 to the inverter 306 in the form of direct current is controlled by a controlling circuit present in the inverter 306. At step 1910, the AC electrical energy is transmitted over the utility grid 324 for power distribution. As described in conjunction with FIG. 3, in some embodiments, the connector 322 can facilitate transmission between the inverter 306 and the utility grid 324. The utility grid 324 can be a mesh of wires that provides a means to transmit AC electrical energy to various sites. At step 1912, the method terminates.

Figure 20:
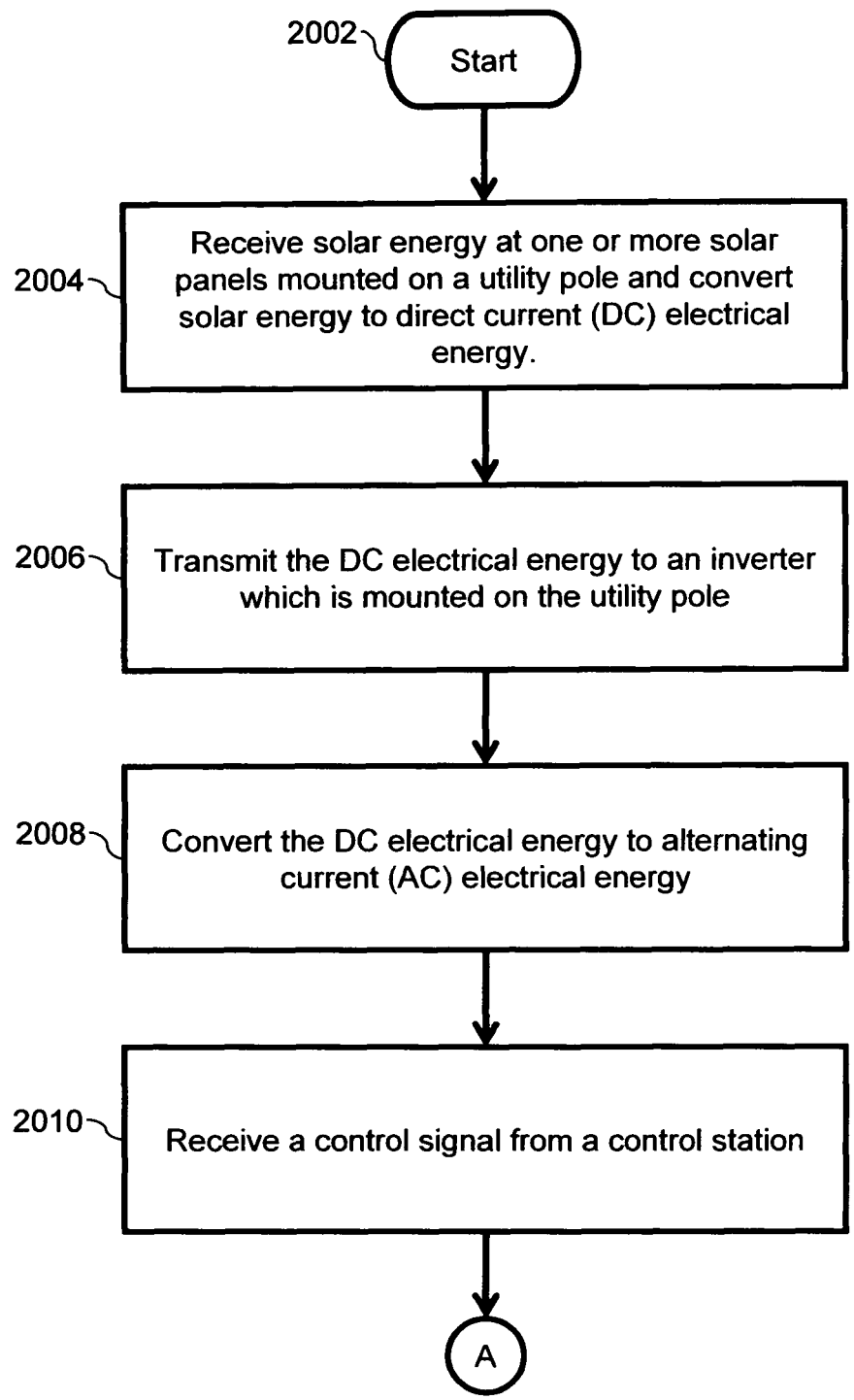
FIGS. 20, 21, and 22 illustrate a flowchart of a method for distributed solar power generation, in accordance with another embodiment of the present invention.
Figure 21:
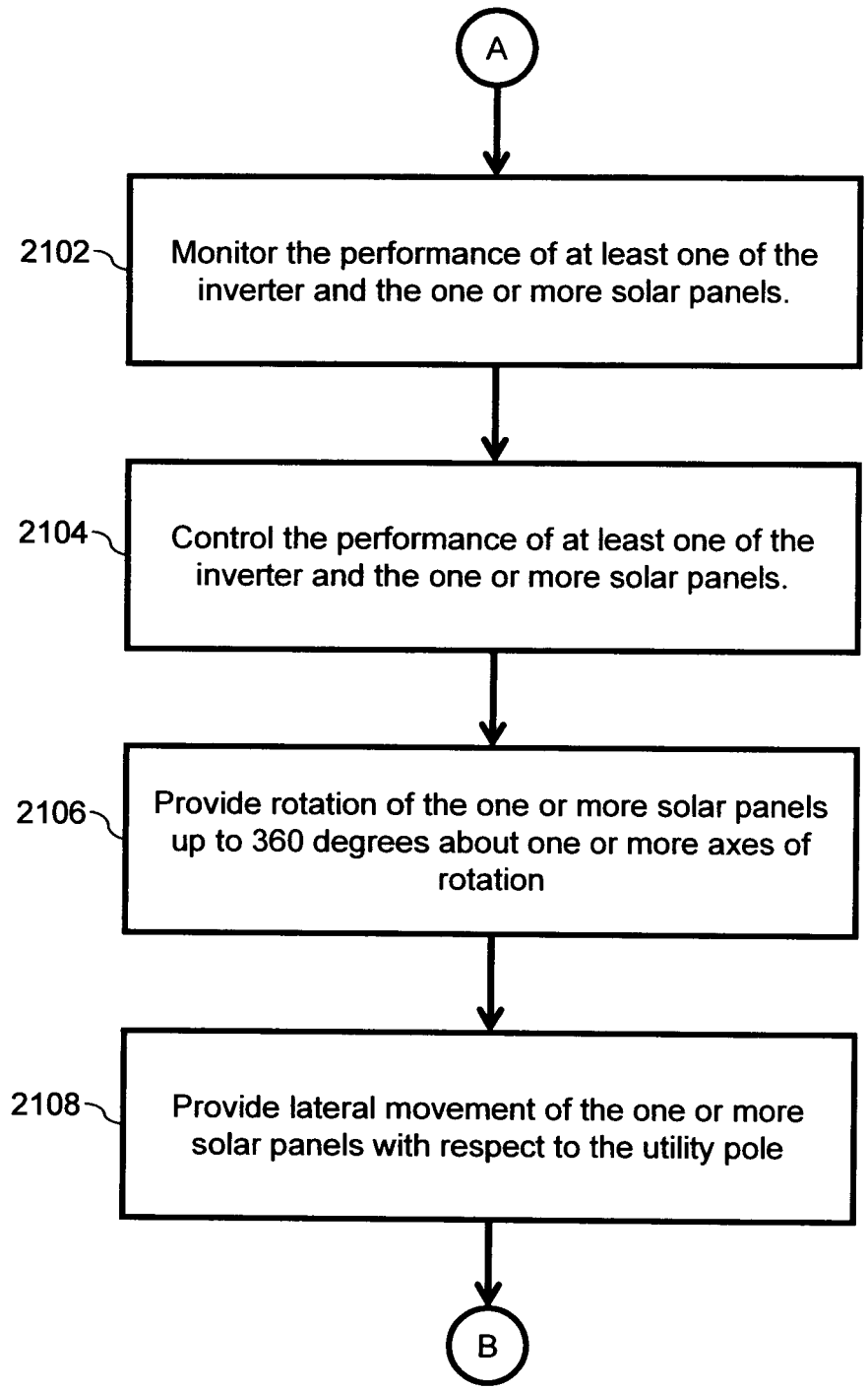
Figure 22:
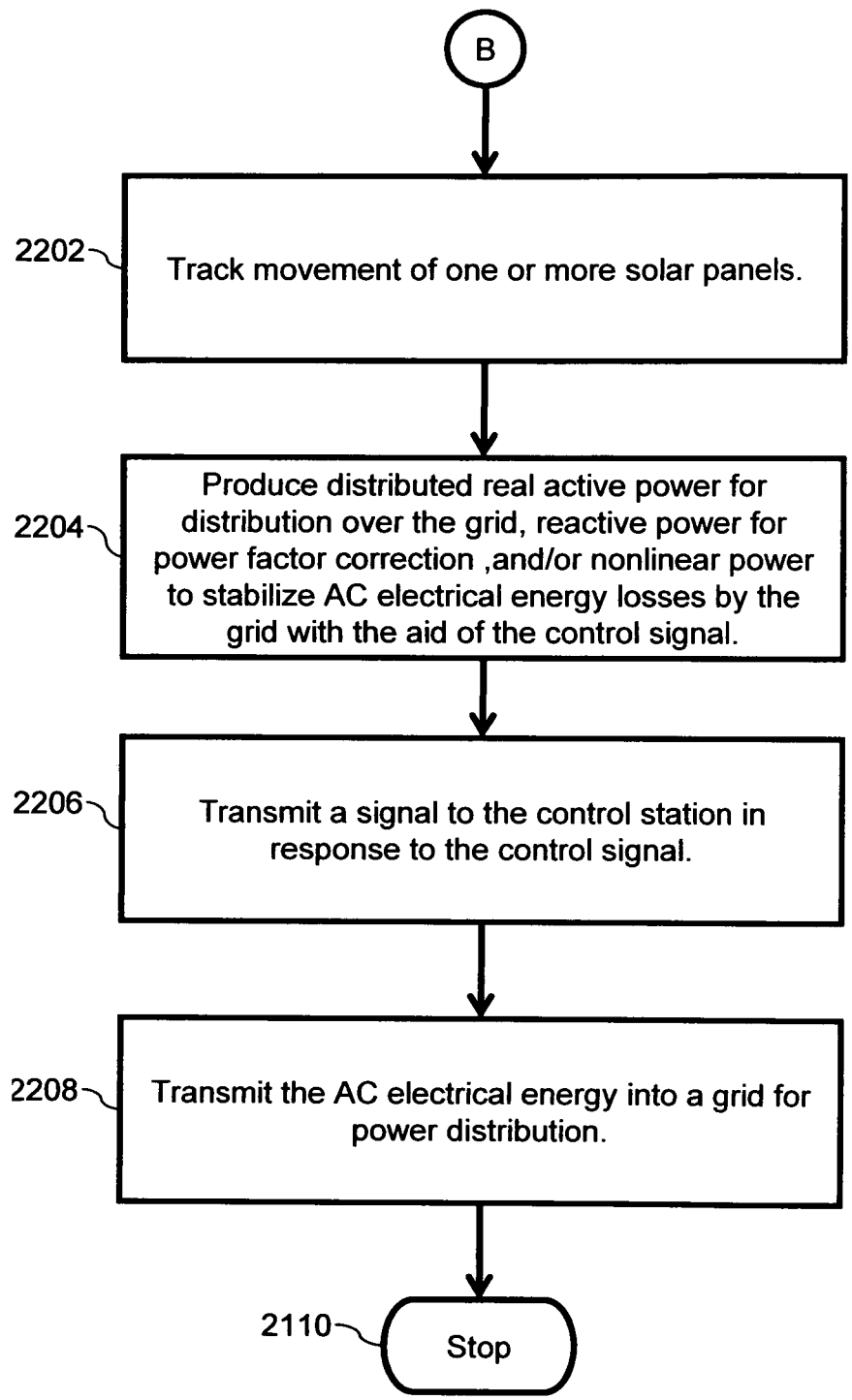

FIGS. 20, 21, and 22 illustrate a method for distributed solar power generation, in accordance with an embodiment of the present invention. To describe the method, references will be made to FIGS. 3, 4, 5 and 6, although it will be apparent to those skilled in the art that the method can be applicable in various other embodiments of the present invention. At step 2002, the method initiates. At step 2004, the one or more solar panels 304 mounted on the utility pole 302 receive solar energy. The one or more solar panels 304 then convert the solar energy to direct current (DC) electrical energy. At step 2006, the DC electrical energy is transmitted to the inverter 306 mounted on the utility pole 302. At step 2008, the DC electrical energy is converted to alternating current (AC) electrical energy by the inverter 306.

Then, at step 2010, the distributed solar power generation system 300 receives a control signal from a control station 326. As described in conjunction with FIG. 3, in one embodiment of the present invention, the control signal is received by the receiver 314 of the communicator 312. Further, the control signal can be used to monitor and control the performance of at least one of the inverter 306 and the one or more solar panels 304. Further, at step 2102, the monitoring system 308 monitors the performance of at least one of the inverter 306 and the one or more solar panels 304. The monitoring of the solar panel 304 can include checking the amount of solar energy received by the one or more solar panels 304 or the total energy being generated by the one or more solar panels.

At step 2104, the control system 310 controls the performance of at least one of the inverter 306 and the one or more solar panels 304. In one embodiment of the present invention, the control system 310 can control the performance of various system elements as described in conjunction with FIG. 3. In another embodiment of the present invention, the control system 310 can work based on information provided by the monitoring system 308.

At step 2106, the movement tracker 318 provides rotation to the one or more solar panels 304, up to 360 degrees, about one or more axes of rotation. Further, the movement tracker 318 provides lateral movement to the one or more solar panels 304 with respect to the utility pole 302 at step 2108. In one embodiment of the present invention, the movement tracker 318 can be controlled by the control system 310. In another embodiment of the present invention, the movement tracker 318 can provide the rotation and lateral movement to the one or more solar panels 304 based on information provided by the monitoring system 308.

At step 2202, the movement tracker 318 tracks the movement of the one or more solar panels 304. Although the steps 2106, 2108 and 2202 have been described in a particular sequence, it will be apparent to those skilled in the art that these steps can be performed in any other sequence. For example, the rotation and lateral movement of the one or more solar panels 304 can be performed after the tracking of movement of the one or more solar panels 304. Further, tracking of movement of the one or more solar panels 304 can be performed again to ensure that the movement has occurred as desired. The main objective of the steps 2106, 2108 and 2202 is to align the one or more solar panels 304 to optimize the reception of solar energy. At step 2204, the inverter 306 can produce distributed reactive power and nonlinear power. The distributed reactive power can be used for power factor correction of the AC electrical energy. Further, the nonlinear power can be used to stabilize the AC electrical energy before distribution to sites with power requirement.

At step 2206, a response signal can be transmitted to the control station 326. In some embodiments of the present invention, the transmitter 316 of the communicator 312 can transmit the response signal to the control station 326. Further, as described in conjunction with FIG. 3, in one embodiment of the present invention, the response signal can indicate completion of adjustment of the distributed solar power generation system 300. In another embodiment of the present invention, the response signal can indicate the state of various parameters of the distributed solar power generation system 300. Further, in yet another embodiment of the present invention, the response signal can simply indicate successful receiving of the control signal by the communicator 312. At step 2208, the inverter 306 transmits AC electrical energy over the utility grid 324 for power distribution. The utility grid 324 can be a mesh that provides a means to transmit AC electrical energy to various sites. Further, in one embodiment of the present invention, the connector 322 can provide a connection between the inverter 306 and the utility grid 324. The method terminates at step 2210.

Various embodiments of the present invention provide the following one or more advantages. The distributed solar power generation system can be located close to the sites of power requirements. Further, as the AC electrical energy is generated at the utility pole, the utility grid 324 can be closer to the distributed solar power generation system as compared to the traditional power generation systems. Therefore, there is minimum distribution loss of electrical energy. Further, peak loading of the utility grid 324 can be matched in a more distributed fashion than with existing systems. The distributed solar power generation system requires a short lead time to provide power as it requires a lesser number of power lines, and the existing infrastructure such as bus-stands, electricity pole etc. can be used to set up the system. The distributed solar power generation system is also more reliable than traditional power generation systems. This is because in case of a fault in one of the utility poles, the shortcoming will be limited to that utility pole and can be supported by other utility poles of the distributed solar power generation system.

The distributed solar power generation system involves solar energy for generation of AC electrical energy and hence results in pollution free generation of electricity. Further, since no roof-top of private buildings is required for installation of the distributed solar power generation system, there is a reduction in the cost of installation as no insurance policies need to be purchased. The cost of installation is also reduced as maintenance of the distributed solar power generation system can be performed by periodic visits of service crews of a company that provides the distributed solar power generation system.

What is claimed is:

1. A distributed solar power generation system comprising:
a utility pole;
at least one solar panel, the at least one solar panel mounted on the utility pole, wherein the at least one solar panel is configured to convert solar energy to direct current (DC) electrical energy;
an inverter mounted on the utility pole, the inverter configured to convert the DC electrical energy converted at the at least one solar panel to alternating current (AC) electrical energy at the utility pole, wherein the inverter is grid-tied and the generated AC electrical energy is transmitted to a utility grid, wherein the inverter is configured as a shunt inverter injecting zero voltage in the grid; and
a controlling circuit connected to the inverter and configured to:
receive a control signal from a control station, the control station located remote to the inverter, and
alter operations of the inverter based on the received control signal, wherein altering operations comprises altering at least one of: generation of reactive power, absorption of reactive power, generation of active power, and absorption of reactive power,
wherein the controlling circuit is further configured to alter the operations of the invertor to inject harmonic current in the grid to control amplitude droop in grid current.

2. The distributed solar power generation system as recited in claim 1, wherein the at least one solar panel comprise photovoltaic material.

3. The distributed solar power generation system as recited in claim 1, wherein the at least one solar panel is supported by a mounting frame.

4. The distributed solar power generation system as recited in claim 1, wherein the inverter is supported by a mounting frame.

5. The distributed solar power generation system as recited in claim 1, wherein the controlling circuit is further configured to control flow of the DC electrical energy from the at least one solar panel to the inverter.

6. The distributed solar power generation system as recited in claim 1, further comprising:
a monitoring system configured to monitor the performance of at least one of the at least one solar panel; and
a control system configured to control the performance of at the least one solar panel.

7. The distributed solar power generation system as recited in claim 1, further comprising a communicator mounted on the utility pole, wherein the communicator comprises:
- a receiver, the receiver configured to receive the control signal from the control station; and
- a transmitter configured to transmit a response signal in response to the control signal.

8. The distributed solar power generation system as recited in claim 1, further comprising a communicator integrated within the inverter, wherein the communicator comprises:
- a receiver, the receiver configured to receive the control signal from the control station; and
- a transmitter configured to transmit a response signal in response to the control signal.

9. The distributed solar power generation system as recited in claim 7, wherein the control signal is used to control performance of the solar power generation system.

10. The distributed solar power generation system as recited in claim 1, wherein the inverter is further configured to:
- produce nonlinear distributed reactive power for power factor correction based on the control signal; and
- produce nonlinear distributed reactive power to stabilize the AC grid voltage based on the control signal.

11. The distributed solar power generation system as recited in claim 1 further comprising a connector configured to:
- connect the inverter to the grid; and
- transmit AC electrical energy to the grid.

12. The distributed solar power generation system as recited in claim 1 wherein the generated AC electrical energy is selected from single phase and three phase.

13. The distributed solar power generation system as recited in claim 1, further comprising a movement tracker, the movement tracker configured to:
- provide rotation to the at least one solar panel up to 360 degrees about at least one axis of rotation; and
- provide lateral movement to the at least one solar panel with respect to the utility pole.

14. The distributed solar power generation system as recited in claim 1 further comprising a battery configured to store the DC electrical energy.

15. A distributed solar power generation system comprising:
- a utility pole; and
- an alternating current photovoltaic (AC PV) module, the AC PV module mounted on the utility pole, the AC PV module comprising:
  - at least one solar panel,
  - an integrated inverter, wherein the inverter is configured as a shunt inverter injecting zero voltage in the grid, and
  - a controlling circuit connected to the inverter and configured to:
    - receive a control signal from a control station, the control station located remote to the inverter, and
    - alter operations of the inverter based on the received control signal, wherein altering operations comprises altering at least one of: generation of reactive power, absorption of reactive power, generation of active power, and absorption of reactive power,
  - wherein the controlling circuit is further configured to alter the operations of the invertor to inject harmonic current in the grid to control amplitude droop in grid current; and
  - wherein the AC PV module is configured to convert solar energy to alternating current (AC) electrical energy, and the AC PV module is grid-tied and the generated AC electrical energy is transmitted to a utility grid via the utility pole.

16. A distributed solar power flow controller comprising:
an alternating current photovoltaic (AC PV) module, the AC PV module comprising:
- at least one solar panel;
- an integrated inverter, wherein the inverter is configured as a shunt inverter injecting zero voltage in the grid; and
- a controlling circuit connected to the inverter and configured to:
  - receive a control signal from a control station, the control station located remote to the inverter, and
  - alter operations of the inverter based on the received control signal wherein altering operations comprises altering at least one of: generation of reactive power, absorption of reactive power, generation of active power, and absorption of reactive power,
- wherein the controlling circuit is further configured to alter the operations of the invertor to inject harmonic current in the grid to control amplitude droop in grid current; and
- wherein the AC PV module is configured to convert solar energy to alternating current (AC) electrical energy.

17. The distributed solar power flow controller as recited in claim 16 further comprising a communicator integrated within the AC PV module, wherein the communicator comprises:
- a receiver, the receiver configured to receive the control signal from the control station; and
- a transmitter configured to transmit a response signal in response to the control signal.

18. The distributed solar power flow controller as recited in claim 16, wherein the AC PV module is further configured to:
- produce distributed nonlinear reactive power for power factor correction based on the control signal; and
- produce distributed nonlinear reactive power to stabilize the AC grid voltage based on the control signal.

19. A method for distributed solar power generation, the method comprising:
- receiving solar energy by at least one solar panel, wherein the at least one solar panel are mounted on a utility pole, and wherein the at least one solar panel converts the solar energy to direct current (DC) electrical energy;
- transmitting the DC electrical energy to an inverter, wherein the inverter is mounted on the utility pole, and wherein the inverter is configured as a shunt inverter injecting zero voltage in the grid;
- converting the DC electrical energy to alternating current (AC) electrical energy by the inverter;
- transmitting the AC electrical energy over a grid for power distribution via the utility pole; and
- altering operations of the inverter based on a control signal received from a control station located remote to the inverter wherein altering operations comprises altering at least one of: generation of reactive power, absorption of reactive power, generation of active power, and absorption of reactive power;
- wherein altering the operations of the inverter further comprises altering the operations of the invertor to inject harmonic current in the grid to control amplitude droop in grid current.

20. The method as recited in claim 19 wherein the utility pole is selected from an electricity pole, light pole, and or telephone pole.

21. The method as recited in claim 19 wherein the generated AC electrical energy is selected from single phase and three phase.

22. The method as recited in claim 19, further comprising monitoring the performance of at least one of the inverter and the at least one solar panel.

23. The method as recited in claim 19, further comprising controlling the performance of at least one of the inverter and the at least one solar panel.

24. The method as recited in claim 19, wherein altering operations of the inverter based on the control signal comprises:
receiving a control signal from the control station; and
transmitting a signal to the control station in response to the control signal.

25. The method as recited in claim 19, further comprising:
producing distributed real active power for distribution over the grid based on the control signal;
producing distributed reactive power for power factor correction based on the control signal; and
producing nonlinear power to stabilize AC electrical energy losses by the grid based on the control signal.

26. The method as recited in claim 19 further comprising:
providing rotation to the at least one solar panel up to 360 degrees about at least one axis of rotation; and
providing lateral movement to the at least one solar panel with respect to the utility pole.

27. The method as recited in claim 26 further comprising tracking movement of the at least one solar panel.

28. A method for distributed solar power generation, the method comprising:

receiving solar energy by at least one solar panel of an alternating current photovoltaic (AC PV) module, wherein the AC PV module is mounted on a utility pole and wherein the AC PV module converts the solar energy into alternating current (AC) electrical energy using an inverter, the inverter is configured as a shunt inverter injecting zero voltage in a grid;

transmitting the AC electrical energy over a grid for power distribution via the utility pole; and altering operations of the inverter based on a control signal received from a control station located remote to the inverter, wherein altering operations comprises altering at least one of: generation of reactive power, absorption of reactive power, generation of active power, and absorption of reactive power;

wherein altering the operations of the inverter further comprises altering the operations of the invertor to inject harmonic current in the grid to control amplitude droop in grid current.

29. The method as recited in claim 28, wherein the step of receiving solar energy further comprising:

converting solar energy into DC electrical energy by the at least one solar panel;

transmitting the DC electrical energy to the inverter, wherein the inverter is a part of the AC PV module and the inverter is attached to the at least one solar panel; and converting the DC electrical energy to alternating current (AC) electrical energy by the inverter.

* * * * *

UNITED STATES PATENT AND TRADEMARK OFFICE
CERTIFICATE OF CORRECTION

PATENT NO. : 8,466,581 B2
APPLICATION NO. : 12/733513
DATED : June 18, 2013
INVENTOR(S) : Shihab Kuran Page 1 of 1

It is certified that error appears in the above-identified patent and that said Letters Patent is hereby corrected as shown below:

IN THE CLAIMS:

Column 16, line 67, claim 6, "at the least" should read --the at least--.

Signed and Sealed this
Second Day of June, 2015

Michelle K. Lee
*Director of the United States Patent and Trademark Office*